United States Patent
Ngo et al.

(10) Patent No.: US 9,002,799 B2
(45) Date of Patent: *Apr. 7, 2015

(54) SYSTEMS AND METHODS FOR RESYNCHRONIZING INFORMATION

(71) Applicant: CommVault Systems, Inc., Oceanport, NJ (US)

(72) Inventors: David Ngo, Shrewsbury, NJ (US); Vijay Agrawal, Ocean, NJ (US)

(73) Assignee: CommVault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/181,359

(22) Filed: Feb. 14, 2014

(65) Prior Publication Data

US 2014/0164327 A1    Jun. 12, 2014

Related U.S. Application Data

(63) Continuation of application No. 11/640,024, filed on Dec. 15, 2006, now Pat. No. 8,655,850.

(60) Provisional application No. 60/752,201, filed on Dec. 19, 2005.

(51) Int. Cl.
G06F 17/30    (2006.01)
G06F 3/06    (2006.01)
(Continued)

(52) U.S. Cl.
CPC .......... *G06F 17/30575* (2013.01); *G06F 3/061* (2013.01); *G06F 3/0631* (2013.01); *G06F 3/0653* (2013.01); *G06F 3/067* (2013.01); *G06F 9/50* (2013.01);
(Continued)

(58) Field of Classification Search
USPC ......................................... 707/655
See application file for complete search history.

(56) References Cited

U.S. PATENT DOCUMENTS 4,296,465 A    10/1981    Lemak
4,686,620 A    8/1987    Ng
(Continued)

FOREIGN PATENT DOCUMENTS

AU    2006331932    12/2006
CA    2632935    12/2006
(Continued)

OTHER PUBLICATIONS

U.S. Appl. No. 14/038,540, filed Sep. 26, 2013, Erofeev.
Armstead et al., "Implementation of a Campus-Wide Distributed Mass Storage Service: The Dream vs. Reality," IEEE, 1995, pp. 190-199.
(Continued)

*Primary Examiner* — Baoquoc N To
(74) *Attorney, Agent, or Firm* — Knobbe, Martens, Olson & Bear, LLP

(57) ABSTRACT

Methods and systems for synchronizing data files in a storage network between a first and a second storage device is provided. The method includes storing first data files associated with the first storage device to a storage medium, whereby the first data files include first data records. The storage medium may then be transferred to the second storage device. The first data files from the storage medium may be loaded onto the second storage device. The second data records from the first storage device may be received, and the first and second data records are compared. The first data files at the second storage device may be updated based on the comparison of the first and second data records.

20 Claims, 9 Drawing Sheets

(51) Int. Cl.
 *G06F 9/50* (2006.01)
 *H04L 29/08* (2006.01)
 *G06F 11/14* (2006.01)

(52) U.S. Cl.
 CPC ... *G06F 17/30176* (2013.01); *G06F 17/30306* (2013.01); *H04L 67/1097* (2013.01); *G06F 3/0647* (2013.01); *G06F 11/1458* (2013.01); *G06F 11/1469* (2013.01)

(56) References Cited

U.S. PATENT DOCUMENTS

| | | |
|---|---|---|
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,231,668 A | 7/1993 | Kravitz |
| 5,239,647 A | 8/1993 | Anglin et al. |
| 5,241,668 A | 8/1993 | Eastridge et al. |
| 5,241,670 A | 8/1993 | Eastridge et al. |
| 5,263,154 A | 11/1993 | Eastridge et al. |
| 5,265,159 A | 11/1993 | Kung |
| 5,276,860 A | 1/1994 | Fortier et al. |
| 5,276,867 A | 1/1994 | Kenley et al. |
| 5,287,500 A | 2/1994 | Stoppani, Jr. |
| 5,301,351 A | 4/1994 | Jippo |
| 5,311,509 A | 5/1994 | Heddes et al. |
| 5,317,731 A | 5/1994 | Dias et al. |
| 5,321,816 A | 6/1994 | Rogan et al. |
| 5,333,315 A | 7/1994 | Saether et al. |
| 5,347,653 A | 9/1994 | Flynn et al. |
| 5,369,757 A | 11/1994 | Spiro et al. |
| 5,403,639 A | 4/1995 | Belsan et al. |
| 5,410,700 A | 4/1995 | Fecteau et al. |
| 5,448,724 A | 9/1995 | Hayashi |
| 5,455,926 A | 10/1995 | Keele et al. |
| 5,487,072 A | 1/1996 | Kant |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,546,536 A | 8/1996 | Davis et al. |
| 5,555,404 A | 9/1996 | Torbjornsen et al. |
| 5,559,957 A | 9/1996 | Balk |
| 5,559,991 A | 9/1996 | Kanfi |
| 5,598,546 A | 1/1997 | Blomgren |
| 5,604,862 A | 2/1997 | Midgely et al. |
| 5,606,693 A | 2/1997 | Nilsen et al. |
| 5,615,392 A | 3/1997 | Harrison et al. |
| 5,619,644 A | 4/1997 | Crockett et al. |
| 5,638,509 A | 6/1997 | Dunphy et al. |
| 5,642,496 A | 6/1997 | Kanfi |
| 5,668,986 A | 9/1997 | Nilsen et al. |
| 5,673,381 A | 9/1997 | Huai et al. |
| 5,675,511 A | 10/1997 | Prasad et al. |
| 5,677,900 A | 10/1997 | Nishida et al. |
| 5,682,513 A | 10/1997 | Candelaria et al. |
| 5,687,343 A | 11/1997 | Fecteau et al. |
| 5,689,706 A | 11/1997 | Rao et al. |
| 5,699,361 A | 12/1997 | Ding et al. |
| 5,719,786 A | 2/1998 | Nelson et al. |
| 5,720,026 A | 2/1998 | Uemura et al. |
| 5,729,743 A | 3/1998 | Squibb |
| 5,737,747 A | 4/1998 | Vishlitzky et al. |
| 5,742,792 A | 4/1998 | Yanai et al. |
| 5,751,997 A | 5/1998 | Kullick et al. |
| 5,758,359 A | 5/1998 | Saxon |
| 5,761,677 A | 6/1998 | Senator et al. |
| 5,761,734 A | 6/1998 | Pfeffer et al. |
| 5,764,972 A | 6/1998 | Crouse et al. |
| 5,765,173 A | 6/1998 | Cane et al. |
| 5,778,395 A | 7/1998 | Whiting et al. |
| 5,790,114 A | 8/1998 | Geaghan et al. |
| 5,790,828 A | 8/1998 | Jost |
| 5,805,920 A | 9/1998 | Sprenkle et al. |
| 5,812,398 A | 9/1998 | Nielsen |
| 5,813,009 A | 9/1998 | Johnson et al. |
| 5,813,017 A | 9/1998 | Morris |
| 5,829,046 A | 10/1998 | Tzelnic et al. |
| 5,860,104 A | 1/1999 | Witt et al. |
| 5,875,478 A | 2/1999 | Blumenau |
| 5,875,481 A | 2/1999 | Ashton et al. |
| 5,878,408 A | 3/1999 | Van Huben et al. |
| 5,887,134 A | 3/1999 | Ebrahim |
| 5,901,327 A | 5/1999 | Ofek |
| 5,907,621 A | 5/1999 | Bachman et al. |
| 5,907,672 A | 5/1999 | Matze et al. |
| 5,924,102 A | 7/1999 | Perks |
| 5,926,836 A | 7/1999 | Blumenau |
| 5,933,104 A | 8/1999 | Kimura |
| 5,933,601 A | 8/1999 | Fanshier et al. |
| 5,950,205 A | 9/1999 | Aviani, Jr. |
| 5,956,519 A | 9/1999 | Wise et al. |
| 5,958,005 A | 9/1999 | Thorne et al. |
| 5,970,233 A | 10/1999 | Liu et al. |
| 5,970,255 A | 10/1999 | Tran et al. |
| 5,974,563 A | 10/1999 | Beeler, Jr. |
| 5,987,478 A | 11/1999 | See et al. |
| 5,991,779 A | 11/1999 | Bejar |
| 5,995,091 A | 11/1999 | Near et al. |
| 6,003,089 A | 12/1999 | Shaffer et al. |
| 6,009,274 A | 12/1999 | Fletcher et al. |
| 6,012,090 A | 1/2000 | Chung et al. |
| 6,021,415 A | 2/2000 | Cannon et al. |
| 6,021,475 A | 2/2000 | Nguyen et al. |
| 6,023,710 A | 2/2000 | Steiner et al. |
| 6,026,414 A | 2/2000 | Anglin |
| 6,049,889 A | 4/2000 | Steely, Jr. et al. |
| 6,052,735 A | 4/2000 | Ulrich et al. |
| 6,058,066 A | 5/2000 | Norris et al. |
| 6,061,692 A | 5/2000 | Thomas et al. |
| 6,072,490 A | 6/2000 | Bates et al. |
| 6,076,148 A | 6/2000 | Kedem |
| 6,088,697 A | 7/2000 | Crockett et al. |
| 6,094,416 A | 7/2000 | Ying |
| 6,105,129 A | 8/2000 | Meier et al. |
| 6,112,239 A | 8/2000 | Kenner et al. |
| 6,122,668 A | 9/2000 | Teng et al. |
| 6,131,095 A | 10/2000 | Low et al. |
| 6,131,148 A | 10/2000 | West et al. |
| 6,131,190 A | 10/2000 | Sidwell |
| 6,137,864 A | 10/2000 | Yaker |
| 6,148,377 A | 11/2000 | Carter et al. |
| 6,148,412 A | 11/2000 | Cannon et al. |
| 6,154,787 A | 11/2000 | Urevig et al. |
| 6,154,852 A | 11/2000 | Amundson et al. |
| 6,158,044 A | 12/2000 | Tibbetts |
| 6,161,111 A | 12/2000 | Mutalik et al. |
| 6,163,856 A | 12/2000 | Dion et al. |
| 6,167,402 A | 12/2000 | Yeager |
| 6,175,829 B1 | 1/2001 | Li et al. |
| 6,195,695 B1 | 2/2001 | Cheston et al. |
| 6,205,450 B1 | 3/2001 | Kanome |
| 6,212,512 B1 | 4/2001 | Barney et al. |
| 6,212,521 B1 | 4/2001 | Minami et al. |
| 6,230,164 B1 | 5/2001 | Rikieta et al. |
| 6,260,068 B1 | 7/2001 | Zalewski et al. |
| 6,260,069 B1 | 7/2001 | Anglin |
| 6,269,431 B1 | 7/2001 | Dunham |
| 6,275,953 B1 | 8/2001 | Vahalia et al. |
| 6,279,078 B1 | 8/2001 | Sicola et al. |
| 6,292,783 B1 | 9/2001 | Rohler |
| 6,301,592 B1 | 10/2001 | Aoyama et al. |
| 6,304,880 B1 | 10/2001 | Kishi |
| 6,311,193 B1 | 10/2001 | Sekido |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |

(56) References Cited

U.S. PATENT DOCUMENTS

| | | |
|---|---|---|
| 6,350,199 B1 | 2/2002 | Williams et al. |
| RE37,601 E | 3/2002 | Eastridge et al. |
| 6,353,878 B1 | 3/2002 | Dunham |
| 6,356,801 B1 | 3/2002 | Goodman et al. |
| 6,363,464 B1 | 3/2002 | Mangione |
| 6,366,986 B1 | 4/2002 | St. Pierre et al. |
| 6,366,988 B1 | 4/2002 | Skiba et al. |
| 6,374,336 B1 | 4/2002 | Peters et al. |
| 6,374,363 B1 | 4/2002 | Wu et al. |
| 6,389,432 B1 | 5/2002 | Pothapragada et al. |
| 6,397,308 B1 | 5/2002 | Ofek et al. |
| 6,418,478 B1 | 7/2002 | Ignatius et al. |
| 6,421,711 B1 | 7/2002 | Blumenau et al. |
| 6,434,681 B1 | 8/2002 | Armangau |
| 6,438,595 B1 | 8/2002 | Blumenau et al. |
| 6,466,950 B1 | 10/2002 | Ono |
| 6,473,775 B1 | 10/2002 | Kusters et al. |
| 6,487,561 B1 | 11/2002 | Ofek et al. |
| 6,487,644 B1 | 11/2002 | Huebsch et al. |
| 6,487,645 B1 | 11/2002 | Clark et al. |
| 6,502,205 B1 | 12/2002 | Yanai et al. |
| 6,516,314 B1 | 2/2003 | Birkler et al. |
| 6,516,327 B1 | 2/2003 | Zondervan et al. |
| 6,516,348 B1 | 2/2003 | MacFarlane et al. |
| 6,519,679 B2 | 2/2003 | Devireddy et al. |
| 6,538,669 B1 | 3/2003 | Lagueux, Jr. et al. |
| 6,539,462 B1 | 3/2003 | Mikkelsen et al. |
| 6,542,468 B1 | 4/2003 | Hatakeyama |
| 6,542,909 B1 | 4/2003 | Tamer et al. |
| 6,542,972 B2 | 4/2003 | Ignatius et al. |
| 6,564,228 B1 | 5/2003 | O'Connor |
| 6,564,229 B1 | 5/2003 | Baweja et al. |
| 6,564,271 B2 | 5/2003 | Micalizzi, Jr. et al. |
| 6,581,143 B2 | 6/2003 | Gagne et al. |
| 6,604,118 B2 | 8/2003 | Kleiman et al. |
| 6,604,149 B1 | 8/2003 | Deo et al. |
| 6,611,849 B1 | 8/2003 | Raff et al. |
| 6,615,223 B1 | 9/2003 | Shih et al. |
| 6,629,189 B1 | 9/2003 | Sandstrom |
| 6,631,477 B1 | 10/2003 | LeCrone et al. |
| 6,631,493 B2 | 10/2003 | Ottesen et al. |
| 6,647,396 B2 | 11/2003 | Parnell et al. |
| 6,647,473 B1 | 11/2003 | Golds et al. |
| 6,651,075 B1 | 11/2003 | Kusters et al. |
| 6,654,825 B2 | 11/2003 | Clapp et al. |
| 6,658,436 B2 | 12/2003 | Oshinsky et al. |
| 6,658,526 B2 | 12/2003 | Nguyen et al. |
| 6,662,198 B2 | 12/2003 | Satyanarayanan et al. |
| 6,665,815 B1 | 12/2003 | Goldstein et al. |
| 6,681,230 B1 | 1/2004 | Blott et al. |
| 6,691,209 B1 | 2/2004 | O'Connell |
| 6,721,767 B2 | 4/2004 | De Meno et al. |
| 6,728,733 B2 | 4/2004 | Tokui |
| 6,732,124 B1 | 5/2004 | Koseki et al. |
| 6,732,125 B1 | 5/2004 | Autrey et al. |
| 6,742,092 B1 | 5/2004 | Huebsch et al. |
| 6,748,504 B2 | 6/2004 | Sawdon et al. |
| 6,751,635 B1 | 6/2004 | Chen et al. |
| 6,757,794 B2 | 6/2004 | Cabrera et al. |
| 6,760,723 B2 | 7/2004 | Oshinsky et al. |
| 6,763,351 B1 | 7/2004 | Subramaniam et al. |
| 6,789,161 B1 | 9/2004 | Blendermann et al. |
| 6,792,472 B1 | 9/2004 | Otterness et al. |
| 6,792,518 B2 | 9/2004 | Armangau et al. |
| 6,799,258 B1 | 9/2004 | Linde |
| 6,820,035 B1 | 11/2004 | Zahavi |
| 6,836,779 B2 | 12/2004 | Poulin |
| 6,839,724 B2 | 1/2005 | Manchanda et al. |
| 6,871,163 B2 | 3/2005 | Hiller et al. |
| 6,871,271 B2 | 3/2005 | Ohran et al. |
| 6,880,051 B2 | 4/2005 | Timpanaro-Perrotta |
| 6,886,020 B1 | 4/2005 | Zahavi et al. |
| 6,892,211 B2 | 5/2005 | Hitz et al. |
| 6,912,482 B2 | 6/2005 | Kaiser |
| 6,925,476 B1 | 8/2005 | Multer et al. |
| 6,925,512 B2 | 8/2005 | Louzoun et al. |
| 6,938,135 B1 | 8/2005 | Kekre et al. |
| 6,938,180 B1 | 8/2005 | Dysert et al. |
| 6,941,393 B2 | 9/2005 | Secatch |
| 6,944,796 B2 | 9/2005 | Joshi et al. |
| 6,952,705 B2 | 10/2005 | Knoblock et al. |
| 6,952,758 B2 | 10/2005 | Chron et al. |
| 6,954,834 B2 | 10/2005 | Slater et al. |
| 6,968,351 B2 | 11/2005 | Butterworth |
| 6,973,553 B1 | 12/2005 | Archibald, Jr. et al. |
| 6,978,265 B2 | 12/2005 | Schumacher |
| 6,981,177 B2 | 12/2005 | Beattie |
| 6,983,351 B2 | 1/2006 | Gibble et al. |
| 6,993,539 B2 | 1/2006 | Federwisch et al. |
| 7,003,519 B1 | 2/2006 | Biettron et al. |
| 7,003,641 B2 | 2/2006 | Prahlad et al. |
| 7,007,046 B2 | 2/2006 | Manley et al. |
| 7,032,131 B2 | 4/2006 | Lubbers et al. |
| 7,035,880 B1 | 4/2006 | Crescenti et al. |
| 7,039,661 B1 | 5/2006 | Ranade |
| 7,051,050 B2 | 5/2006 | Chen et al. |
| 7,062,761 B2 | 6/2006 | Slavin et al. |
| 7,065,538 B2 | 6/2006 | Aronoff et al. |
| 7,068,597 B1 | 6/2006 | Fijolek et al. |
| 7,082,441 B1 | 7/2006 | Zahavi et al. |
| 7,085,787 B2 | 8/2006 | Beier et al. |
| 7,085,904 B2 | 8/2006 | Mizuno et al. |
| 7,093,012 B2 | 8/2006 | Olstad et al. |
| 7,096,315 B2 | 8/2006 | Takeda et al. |
| 7,103,731 B2 | 9/2006 | Gibble et al. |
| 7,103,740 B1 | 9/2006 | Colgrove et al. |
| 7,106,691 B1 | 9/2006 | Decaluwe et al. |
| 7,107,298 B2 | 9/2006 | Prahlad et al. |
| 7,107,395 B1 | 9/2006 | Ofek et al. |
| 7,111,021 B1 | 9/2006 | Lewis et al. |
| 7,111,189 B1 | 9/2006 | Sicola et al. |
| 7,120,757 B2 | 10/2006 | Tsuge |
| 7,130,860 B2 | 10/2006 | Pachet |
| 7,130,970 B2 | 10/2006 | Devassy et al. |
| 7,139,932 B2 | 11/2006 | Watanabe |
| 7,155,465 B2 | 12/2006 | Lee et al. |
| 7,155,633 B2 | 12/2006 | Tuma et al. |
| 7,158,985 B1 | 1/2007 | Liskov |
| 7,177,866 B2 | 2/2007 | Holenstein et al. |
| 7,181,477 B2 | 2/2007 | Saika et al. |
| 7,188,292 B2 | 3/2007 | Cordina et al. |
| 7,191,198 B2 | 3/2007 | Asano et al. |
| 7,194,454 B2 | 3/2007 | Hansen et al. |
| 7,194,487 B1 | 3/2007 | Kekre et al. |
| 7,200,620 B2 | 4/2007 | Gupta |
| 7,203,807 B2 | 4/2007 | Urabe et al. |
| 7,209,972 B1 | 4/2007 | Ignatius et al. |
| 7,225,204 B2 | 5/2007 | Manley et al. |
| 7,225,208 B2 | 5/2007 | Midgley et al. |
| 7,225,210 B2 | 5/2007 | Guthrie, II. |
| 7,228,456 B2 | 6/2007 | Lecrone et al. |
| 7,231,391 B2 | 6/2007 | Aronoff et al. |
| 7,231,544 B2 | 6/2007 | Tan et al. |
| 7,234,115 B1 | 6/2007 | Sprauve et al. |
| 7,246,140 B2 | 7/2007 | Therrien et al. |
| 7,246,207 B2 | 7/2007 | Kottomtharayil |
| 7,257,689 B1 | 8/2007 | Baird |
| 7,269,612 B2 | 9/2007 | Devarakonda et al. |
| 7,269,641 B2 | 9/2007 | Powers et al. |
| 7,272,606 B2 | 9/2007 | Borthakur et al. |
| 7,275,138 B2 | 9/2007 | Saika |
| 7,275,177 B2 | 9/2007 | Armangau et al. |
| 7,278,142 B2 | 10/2007 | Bandhole et al. |
| 7,284,153 B2 | 10/2007 | Okbay et al. |
| 7,287,047 B2 | 10/2007 | Kavuri |
| 7,293,133 B1 | 11/2007 | Colgrove et al. |
| 7,296,125 B2 | 11/2007 | Ohran |
| 7,315,923 B2 | 1/2008 | Retnamma et al. |
| 7,318,134 B1 | 1/2008 | Oliveira et al. |
| 7,340,652 B2 | 3/2008 | Jarvis et al. |
| 7,343,356 B2 | 3/2008 | Prahlad et al. |
| 7,343,365 B2 | 3/2008 | Farnham et al. |
| 7,343,453 B2 | 3/2008 | Prahlad et al. |
| 7,343,459 B2 | 3/2008 | Prahlad et al. |

(56) References Cited

U.S. PATENT DOCUMENTS

| | | |
|---|---|---|
| 7,346,623 B2 | 3/2008 | Prahlad et al. |
| 7,346,751 B2 | 3/2008 | Prahlad et al. |
| 7,356,657 B2 | 4/2008 | Mikami |
| 7,359,917 B2 | 4/2008 | Winter et al. |
| 7,363,444 B2 | 4/2008 | Ji |
| 7,370,232 B2 | 5/2008 | Safford |
| 7,373,364 B1 | 5/2008 | Chapman |
| 7,380,072 B2 | 5/2008 | Kottomtharayil et al. |
| 7,383,293 B2 | 6/2008 | Gupta et al. |
| 7,389,311 B1 | 6/2008 | Crescenti et al. |
| 7,392,360 B1 | 6/2008 | Aharoni et al. |
| 7,395,282 B1 | 7/2008 | Crescenti et al. |
| 7,401,064 B1 | 7/2008 | Arone et al. |
| 7,409,509 B2 | 8/2008 | Devassy et al. |
| 7,415,488 B1 | 8/2008 | Muth et al. |
| 7,428,657 B2 | 9/2008 | Yamasaki |
| 7,430,587 B2 | 9/2008 | Malone et al. |
| 7,433,301 B2 | 10/2008 | Akahane et al. |
| 7,440,982 B2 | 10/2008 | Lu et al. |
| 7,454,569 B2 | 11/2008 | Kavuri et al. |
| 7,457,980 B2 | 11/2008 | Yang et al. |
| 7,461,230 B1 | 12/2008 | Gupta et al. |
| 7,464,236 B2 | 12/2008 | Sano et al. |
| 7,467,167 B2 | 12/2008 | Patterson |
| 7,467,267 B1 | 12/2008 | Mayock |
| 7,469,262 B2 | 12/2008 | Baskaran et al. |
| 7,472,238 B1 | 12/2008 | Gokhale |
| 7,472,312 B2 | 12/2008 | Jarvis et al. |
| 7,475,284 B2 | 1/2009 | Koike |
| 7,484,054 B2 | 1/2009 | Kottomtharayil et al. |
| 7,490,207 B2 | 2/2009 | Amarendran |
| 7,496,589 B1 | 2/2009 | Jain et al. |
| 7,496,690 B2 | 2/2009 | Beverly et al. |
| 7,500,053 B1 | 3/2009 | Kavuri et al. |
| 7,500,150 B2 | 3/2009 | Sharma et al. |
| 7,502,902 B2 | 3/2009 | Sato |
| 7,509,316 B2 | 3/2009 | Greenblatt et al. |
| 7,512,601 B2 | 3/2009 | Cucerzan et al. |
| 7,516,088 B2 | 4/2009 | Johnson et al. |
| 7,519,726 B2 | 4/2009 | Palliyil et al. |
| 7,523,483 B2 | 4/2009 | Dogan et al. |
| 7,529,745 B2 | 5/2009 | Ahluwalia et al. |
| 7,529,748 B2 | 5/2009 | Wen et al. |
| 7,529,782 B2 | 5/2009 | Prahlad et al. |
| 7,529,898 B2 | 5/2009 | Nguyen et al. |
| 7,532,340 B2 | 5/2009 | Koppich et al. |
| 7,533,181 B2 | 5/2009 | Dawson et al. |
| 7,536,291 B1 | 5/2009 | Retnamma et al. |
| 7,539,707 B2 | 5/2009 | Prahlad et al. |
| 7,539,835 B2 | 5/2009 | Kaiser |
| 7,543,125 B2 | 6/2009 | Gokhale |
| 7,546,324 B2 | 6/2009 | Prahlad et al. |
| 7,546,364 B2 | 6/2009 | Raman et al. |
| 7,565,572 B2 | 7/2009 | Yamasaki |
| 7,581,077 B2 | 8/2009 | Ignatius et al. |
| 7,593,966 B2 | 9/2009 | Therrien et al. |
| 7,596,586 B2 | 9/2009 | Gokhale et al. |
| 7,606,841 B1 | 10/2009 | Ranade |
| 7,606,844 B2 | 10/2009 | Kottomtharayil |
| 7,613,748 B2 | 11/2009 | Brockway et al. |
| 7,613,750 B2 | 11/2009 | Valiyaparambil et al. |
| 7,617,253 B2 | 11/2009 | Prahlad et al. |
| 7,617,262 B2 | 11/2009 | Prahlad et al. |
| 7,617,321 B2 | 11/2009 | Clark |
| 7,617,369 B1 | 11/2009 | Bezbaruah et al. |
| 7,617,541 B2 | 11/2009 | Plotkin et al. |
| 7,627,598 B1 | 12/2009 | Burke |
| 7,627,617 B2 | 12/2009 | Kavuri et al. |
| 7,636,743 B2 | 12/2009 | Erofeev |
| 7,651,593 B2 | 1/2010 | Prahlad et al. |
| 7,661,028 B2 | 2/2010 | Erofeev |
| 7,668,798 B2 | 2/2010 | Scanlon et al. |
| 7,669,029 B1 | 2/2010 | Mishra et al. |
| 7,673,000 B2 | 3/2010 | Smoot et al. |
| 7,685,126 B2 | 3/2010 | Patel et al. |
| 7,689,467 B1 | 3/2010 | Belanger et al. |
| 7,694,086 B1 | 4/2010 | Bezbaruah et al. |
| 7,702,533 B2 | 4/2010 | Barnard et al. |
| 7,702,670 B1 | 4/2010 | Duprey et al. |
| 7,707,184 B1 | 4/2010 | Zhang et al. |
| 7,716,171 B2 | 5/2010 | Kryger |
| 7,734,715 B2 | 6/2010 | Hyakutake et al. |
| 7,739,235 B2 | 6/2010 | Rousseau et al. |
| 7,809,691 B1 | 10/2010 | Karmarkar et al. |
| 7,810,067 B2 | 10/2010 | Kaelicke et al. |
| 7,831,553 B2 | 11/2010 | Prahlad et al. |
| 7,831,622 B2 | 11/2010 | Prahlad et al. |
| 7,840,533 B2 | 11/2010 | Prahlad et al. |
| 7,840,537 B2 | 11/2010 | Gokhale et al. |
| 7,870,355 B2 | 1/2011 | Erofeev |
| 7,904,681 B1 | 3/2011 | Bappe |
| 7,930,476 B1 | 4/2011 | Castelli et al. |
| 7,962,455 B2 | 6/2011 | Erofeev |
| 7,962,709 B2 | 6/2011 | Agrawal |
| 8,005,795 B2 | 8/2011 | Galipeau et al. |
| 8,024,294 B2 | 9/2011 | Kottomtharayil |
| 8,121,983 B2 | 2/2012 | Prahlad et al. |
| 8,166,263 B2 | 4/2012 | Prahlad |
| 8,190,565 B2 | 5/2012 | Prahlad et al. |
| 8,195,623 B2 | 6/2012 | Prahlad et al. |
| 8,204,859 B2 | 6/2012 | Ngo |
| 8,219,524 B2 | 7/2012 | Gokhale |
| 8,271,830 B2 | 9/2012 | Erofeev |
| 8,285,684 B2 | 10/2012 | Prahlad et al. |
| 8,352,422 B2 | 1/2013 | Prahlad et al. |
| 8,463,751 B2 | 6/2013 | Kottomtharayil |
| 8,489,656 B2 | 7/2013 | Erofeev |
| 8,504,515 B2 | 8/2013 | Prahlad et al. |
| 8,504,517 B2 | 8/2013 | Agrawal |
| 8,572,038 B2 | 10/2013 | Erofeev |
| 8,589,347 B2 | 11/2013 | Erofeev |
| 8,645,320 B2 | 2/2014 | Prahlad et al. |
| 8,655,850 B2 | 2/2014 | Ngo et al. |
| 8,656,218 B2 | 2/2014 | Erofeev |
| 8,666,942 B2 | 3/2014 | Ngo |
| 8,725,694 B2 | 5/2014 | Kottomtharayil |
| 8,725,698 B2 | 5/2014 | Prahlad et al. |
| 8,726,242 B2 | 5/2014 | Ngo |
| 8,745,105 B2 | 6/2014 | Erofeev |
| 8,793,221 B2 | 7/2014 | Prahlad et al. |
| 8,868,494 B2 | 10/2014 | Agrawal |
| 2001/0029512 A1 | 10/2001 | Oshinsky et al. |
| 2001/0029517 A1 | 10/2001 | De Meno et al. |
| 2001/0032172 A1 | 10/2001 | Moulinet et al. |
| 2001/0035866 A1 | 11/2001 | Finger et al. |
| 2001/0042222 A1 | 11/2001 | Kedem et al. |
| 2001/0044807 A1 | 11/2001 | Kleiman et al. |
| 2002/0002557 A1 | 1/2002 | Straube et al. |
| 2002/0004883 A1 | 1/2002 | Nguyen et al. |
| 2002/0019909 A1 | 2/2002 | D'Errico |
| 2002/0023051 A1 | 2/2002 | Kunzle et al. |
| 2002/0040376 A1 | 4/2002 | Yamanaka et al. |
| 2002/0042869 A1 | 4/2002 | Tate et al. |
| 2002/0049626 A1 | 4/2002 | Mathias et al. |
| 2002/0049718 A1 | 4/2002 | Kleiman et al. |
| 2002/0049738 A1 | 4/2002 | Epstein |
| 2002/0049778 A1 | 4/2002 | Bell et al. |
| 2002/0062230 A1 | 5/2002 | Morag et al. |
| 2002/0069324 A1 | 6/2002 | Gerasimov et al. |
| 2002/0083055 A1 | 6/2002 | Pachet et al. |
| 2002/0091712 A1 | 7/2002 | Martin et al. |
| 2002/0103848 A1 | 8/2002 | Giacomini et al. |
| 2002/0107877 A1 | 8/2002 | Whiting et al. |
| 2002/0112134 A1 | 8/2002 | Ohran et al. |
| 2002/0120741 A1 | 8/2002 | Webb et al. |
| 2002/0124137 A1 | 9/2002 | Ulrich et al. |
| 2002/0133511 A1 | 9/2002 | Hostetter et al. |
| 2002/0133512 A1 | 9/2002 | Milillo et al. |
| 2002/0161753 A1 | 10/2002 | Inaba et al. |
| 2002/0174107 A1 | 11/2002 | Poulin |
| 2002/0174139 A1 | 11/2002 | Midgley et al. |
| 2002/0174416 A1 | 11/2002 | Bates et al. |
| 2002/0181395 A1 | 12/2002 | Foster et al. |
| 2003/0005119 A1 | 1/2003 | Mercier et al. |

(56) References Cited

U.S. PATENT DOCUMENTS

| | | |
|---|---|---|
| 2003/0018657 A1 | 1/2003 | Monday |
| 2003/0023893 A1 | 1/2003 | Lee et al. |
| 2003/0028736 A1 | 2/2003 | Berkowitz et al. |
| 2003/0033308 A1 | 2/2003 | Patel et al. |
| 2003/0061491 A1 | 3/2003 | Jaskiewicz et al. |
| 2003/0079018 A1 | 4/2003 | Lolayekar et al. |
| 2003/0097296 A1 | 5/2003 | Putt |
| 2003/0126200 A1 | 7/2003 | Wolff |
| 2003/0131278 A1 | 7/2003 | Fujibayashi |
| 2003/0135783 A1 | 7/2003 | Martin et al. |
| 2003/0161338 A1 | 8/2003 | Ng et al. |
| 2003/0167380 A1 | 9/2003 | Green et al. |
| 2003/0177149 A1 | 9/2003 | Coombs |
| 2003/0177321 A1 | 9/2003 | Watanabe |
| 2003/0187847 A1 | 10/2003 | Lubbers et al. |
| 2003/0225800 A1 | 12/2003 | Kavuri |
| 2004/0006572 A1 | 1/2004 | Hoshino et al. |
| 2004/0006578 A1 | 1/2004 | Yu |
| 2004/0010487 A1 | 1/2004 | Prahlad et al. |
| 2004/0015468 A1 | 1/2004 | Beier et al. |
| 2004/0039679 A1 | 2/2004 | Norton et al. |
| 2004/0078632 A1 | 4/2004 | Infante et al. |
| 2004/0098425 A1 | 5/2004 | Wiss et al. |
| 2004/0107199 A1 | 6/2004 | Dairymple, III et al. |
| 2004/0117438 A1 | 6/2004 | Considine et al. |
| 2004/0117572 A1 | 6/2004 | Welsh et al. |
| 2004/0133634 A1 | 7/2004 | Luke et al. |
| 2004/0139128 A1 | 7/2004 | Becker et al. |
| 2004/0158588 A1 | 8/2004 | Pruet |
| 2004/0193625 A1 | 9/2004 | Sutoh |
| 2004/0193953 A1 | 9/2004 | Callahan et al. |
| 2004/0205206 A1 | 10/2004 | Naik et al. |
| 2004/0212639 A1 | 10/2004 | Smoot et al. |
| 2004/0215724 A1 | 10/2004 | Smoot et al. |
| 2004/0225437 A1 | 11/2004 | Endo et al. |
| 2004/0230829 A1 | 11/2004 | Dogan et al. |
| 2004/0236958 A1 | 11/2004 | Teicher et al. |
| 2004/0249883 A1 | 12/2004 | Srinivasan et al. |
| 2004/0250033 A1 | 12/2004 | Prahlad et al. |
| 2004/0254919 A1 | 12/2004 | Giuseppini |
| 2004/0260678 A1 | 12/2004 | Verbowski et al. |
| 2004/0267777 A1 | 12/2004 | Sugimura et al. |
| 2004/0267835 A1 | 12/2004 | Zwilling et al. |
| 2004/0267836 A1 | 12/2004 | Armangau et al. |
| 2005/0015409 A1 | 1/2005 | Cheng et al. |
| 2005/0027892 A1 | 2/2005 | McCabe et al. |
| 2005/0033800 A1 | 2/2005 | Kavuri et al. |
| 2005/0044114 A1 | 2/2005 | Kottomtharayil et al. |
| 2005/0055445 A1 | 3/2005 | Gupta et al. |
| 2005/0060613 A1 | 3/2005 | Cheng |
| 2005/0071389 A1 | 3/2005 | Gupta et al. |
| 2005/0071391 A1 | 3/2005 | Fuerderer et al. |
| 2005/0080928 A1 | 4/2005 | Beverly et al. |
| 2005/0086443 A1 | 4/2005 | Mizuno et al. |
| 2005/0108292 A1 | 5/2005 | Burton et al. |
| 2005/0114406 A1 | 5/2005 | Borthakur et al. |
| 2005/0131900 A1 | 6/2005 | Palliyll et al. |
| 2005/0138306 A1 | 6/2005 | Panchbudhe et al. |
| 2005/0144202 A1 | 6/2005 | Chen |
| 2005/0172073 A1 | 8/2005 | Voigt |
| 2005/0187982 A1 | 8/2005 | Sato |
| 2005/0187992 A1 | 8/2005 | Prahlad et al. |
| 2005/0188109 A1 | 8/2005 | Shiga et al. |
| 2005/0188254 A1 | 8/2005 | Urabe et al. |
| 2005/0193026 A1 | 9/2005 | Prahlad et al. |
| 2005/0198083 A1 | 9/2005 | Saika et al. |
| 2005/0228875 A1 | 10/2005 | Monitzer et al. |
| 2005/0246376 A1 | 11/2005 | Lu et al. |
| 2005/0246510 A1 | 11/2005 | Retnamma et al. |
| 2005/0254456 A1 | 11/2005 | Sakai |
| 2005/0268068 A1 | 12/2005 | Ignatius et al. |
| 2006/0005048 A1 | 1/2006 | Osaki et al. |
| 2006/0010154 A1 | 1/2006 | Prahlad et al. |
| 2006/0010227 A1 | 1/2006 | Atluri |
| 2006/0010341 A1 | 1/2006 | Kodama |
| 2006/0020616 A1 | 1/2006 | Hardy et al. |
| 2006/0034454 A1 | 2/2006 | Damgaard et al. |
| 2006/0036901 A1 | 2/2006 | Yang et al. |
| 2006/0047805 A1 | 3/2006 | Byrd et al. |
| 2006/0047931 A1 | 3/2006 | Saika |
| 2006/0092861 A1 | 5/2006 | Corday et al. |
| 2006/0107089 A1 | 5/2006 | Jansz et al. |
| 2006/0120401 A1 | 6/2006 | Harada et al. |
| 2006/0129537 A1 | 6/2006 | Torii et al. |
| 2006/0136685 A1 | 6/2006 | Griv et al. |
| 2006/0155946 A1 | 7/2006 | Ji |
| 2006/0171315 A1 | 8/2006 | Choi et al. |
| 2006/0174075 A1 | 8/2006 | Sutoh |
| 2006/0215564 A1 | 9/2006 | Breitgand et al. |
| 2006/0230244 A1 | 10/2006 | Amarendran et al. |
| 2006/0242371 A1 | 10/2006 | Shono et al. |
| 2006/0242489 A1 | 10/2006 | Brockway et al. |
| 2007/0033437 A1 | 2/2007 | Kawamura |
| 2007/0043956 A1 | 2/2007 | El Far et al. |
| 2007/0050547 A1 | 3/2007 | Sano et al. |
| 2007/0055737 A1 | 3/2007 | Yamashita et al. |
| 2007/0094467 A1 | 4/2007 | Yamasaki |
| 2007/0100867 A1 | 5/2007 | Celik et al. |
| 2007/0112897 A1 | 5/2007 | Asano et al. |
| 2007/0113006 A1 | 5/2007 | Elliott et al. |
| 2007/0124347 A1 | 5/2007 | Vivian et al. |
| 2007/0124348 A1 | 5/2007 | Claborn et al. |
| 2007/0130373 A1 | 6/2007 | Kalwitz |
| 2007/0143371 A1 | 6/2007 | Kottomtharayil |
| 2007/0143756 A1 | 6/2007 | Gokhale |
| 2007/0179990 A1 | 8/2007 | Zimran et al. |
| 2007/0183224 A1 | 8/2007 | Erofeev |
| 2007/0185852 A1 | 8/2007 | Erofeev |
| 2007/0185937 A1 | 8/2007 | Prahlad et al. |
| 2007/0185938 A1 | 8/2007 | Prahlad et al. |
| 2007/0185939 A1 | 8/2007 | Prahlad et al. |
| 2007/0185940 A1 | 8/2007 | Prahlad et al. |
| 2007/0186042 A1 | 8/2007 | Kottomtharayil et al. |
| 2007/0186068 A1 | 8/2007 | Agrawal |
| 2007/0198602 A1 | 8/2007 | Ngo et al. |
| 2007/0226438 A1 | 9/2007 | Erofeev |
| 2007/0244571 A1 | 10/2007 | Wilson et al. |
| 2007/0260609 A1 | 11/2007 | Tulyani |
| 2007/0276848 A1 | 11/2007 | Kim |
| 2007/0288536 A1 | 12/2007 | Sen et al. |
| 2008/0016126 A1 | 1/2008 | Kottomtharayil et al. |
| 2008/0016293 A1 | 1/2008 | Saika |
| 2008/0059515 A1 | 3/2008 | Fulton |
| 2008/0077634 A1 | 3/2008 | Quakenbush |
| 2008/0077636 A1 | 3/2008 | Gupta et al. |
| 2008/0103916 A1 | 5/2008 | Camarador et al. |
| 2008/0104357 A1 | 5/2008 | Kim et al. |
| 2008/0114815 A1 | 5/2008 | Sutoh |
| 2008/0147878 A1 | 6/2008 | Kottomtharayil et al. |
| 2008/0183775 A1 | 7/2008 | Prahlad et al. |
| 2008/0205301 A1 | 8/2008 | Burton et al. |
| 2008/0208933 A1 | 8/2008 | Lyon |
| 2008/0228987 A1 | 9/2008 | Yagi |
| 2008/0229037 A1 | 9/2008 | Bunte et al. |
| 2008/0243914 A1 | 10/2008 | Prahlad et al. |
| 2008/0243957 A1 | 10/2008 | Prahlad et al. |
| 2008/0243958 A1 | 10/2008 | Prahlad et al. |
| 2008/0244205 A1 | 10/2008 | Amano et al. |
| 2008/0250178 A1 | 10/2008 | Haustein et al. |
| 2008/0306954 A1 | 12/2008 | Hornqvist |
| 2008/0313497 A1 | 12/2008 | Hirakawa |
| 2009/0013014 A1 | 1/2009 | Kern et al. |
| 2009/0044046 A1 | 2/2009 | Yamasaki |
| 2009/0113056 A1 | 4/2009 | Tameshige et al. |
| 2009/0150462 A1 | 6/2009 | McClanahan et al. |
| 2009/0182963 A1 | 7/2009 | Prahlad et al. |
| 2009/0187944 A1 | 7/2009 | White et al. |
| 2009/0300079 A1 | 12/2009 | Shitomi |
| 2009/0319534 A1 | 12/2009 | Gokhale |
| 2009/0319585 A1 | 12/2009 | Gokhale |
| 2010/0005259 A1 | 1/2010 | Prahlad |
| 2010/0049753 A1 | 2/2010 | Prahlad et al. |
| 2010/0094808 A1 | 4/2010 | Erofeev |
| 2010/0100529 A1 | 4/2010 | Erofeev |

(56) References Cited

U.S. PATENT DOCUMENTS

| | | |
|---|---|---|
| 2010/0131461 A1 | 5/2010 | Prahlad et al. |
| 2010/0131467 A1 | 5/2010 | Prahlad et al. |
| 2010/0145909 A1 | 6/2010 | Ngo |
| 2010/0153338 A1 | 6/2010 | Ngo et al. |
| 2010/0179941 A1 | 7/2010 | Agrawal et al. |
| 2010/0205150 A1 | 8/2010 | Prahlad et al. |
| 2010/0211571 A1 | 8/2010 | Prahlad et al. |
| 2011/0066599 A1 | 3/2011 | Prahlad et al. |
| 2013/0006938 A1 | 1/2013 | Prahlad et al. |
| 2013/0006942 A1 | 1/2013 | Prahlad et al. |
| 2014/0032495 A1 | 1/2014 | Erofeev |
| 2014/0067764 A1 | 3/2014 | Prahlad et al. |
| 2014/0074777 A1 | 3/2014 | Agrawal |
| 2014/0164327 A1* | 6/2014 | Ngo et al. ............ 707/625 |
| 2014/0181022 A1 | 6/2014 | Ngo |
| 2014/0181029 A1 | 6/2014 | Erofeev |
| 2014/0236900 A1 | 8/2014 | Kottomtharayil |
| 2014/0244586 A1 | 8/2014 | Ngo |

FOREIGN PATENT DOCUMENTS

| | | |
|---|---|---|
| EP | 0259912 | 3/1988 |
| EP | 0405926 | 1/1991 |
| EP | 0467546 | 1/1992 |
| EP | 0774715 | 5/1997 |
| EP | 0809184 | 11/1997 |
| EP | 0862304 | 9/1998 |
| EP | 0899662 | 3/1999 |
| EP | 0981090 | 2/2000 |
| EP | 1174795 | 1/2002 |
| EP | 1349089 | 1/2003 |
| EP | 1349088 | 10/2003 |
| EP | 1579331 | 9/2005 |
| EP | 1974296 | 10/2008 |
| GB | 2256952 | 12/1992 |
| GB | 2411030 | 8/2005 |
| JP | 05189281 | 7/1993 |
| JP | 06274605 | 9/1994 |
| JP | 09016463 | 1/1997 |
| JP | 11259348 | 9/1999 |
| JP | 200347811 | 12/2000 |
| WO | WO 93/03549 | 2/1993 |
| WO | WO 95/13580 | 5/1995 |
| WO | WO 98/39707 | 9/1998 |
| WO | WO 99/12098 | 3/1999 |
| WO | WO 99/14692 | 3/1999 |
| WO | WO 02/095632 | 11/2002 |
| WO | WO 03/028183 | 4/2003 |
| WO | WO 2004/034197 | 4/2004 |
| WO | WO 2005/055093 | 6/2005 |
| WO | WO 2005/086032 | 9/2005 |
| WO | WO 2007/053314 | 5/2007 |
| WO | WO 2010/068570 | 6/2010 |

OTHER PUBLICATIONS

Arneson, "Development of Omniserver; Mass Storage Systems," Control Data Corporation, 1990, pp. 88-93.

Arneson, "Mass Storage Archiving in Network Environments" IEEE, 1998, pp. 45-50.

Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Calvert, Andrew, "SQL Server 2005 Snapshots", published Apr. 3, 2006, http:/www.simple-talk.com/contnet/print.aspx?article=137, 6 pages.

Eitel, "Backup and Storage Management in Distributed Heterogeneous Environments," IEEE, 1994, pp. 124-126.

Gait, "The Optical File Cabinet: A Random-Access File system for Write-Once Optical Disks," IEEE Computer, vol. 21, No. 6, pp. 11-22 (1988).

Gray, et al. "Transaction processing: concepts andtechniques" 1994, Morgan Kaufmann Publishers, USA, pp. 604-609, 646-655.B7.

Harrington, "The RFP Process: How To Hire a Third Party", Transportation & Distribution, Sep. 1988, vol. 39, Issue 9, in 5 pages.

http://en.wikipedia.org/wiki/Naive_Bayes_classifier, printed on Jun. 1, 2010, in 7 pages.

IBM, "Intelligent Selection of Logs Required During Recovery Processing", ip.com, Sep. 16, 2002, 4 pages.

IBM, "Near Zero Impact Backup and Data Replication Appliance", ip.com, Oct. 18, 2004, 5 pages.

Jander, "Launching Storage-Area Net," Data Communications, US, McGraw Hill, NY, vol. 27, No. 4(Mar. 21, 1998), pp. 64-72.

Kashyap, et al., "Professional Services Automation: A knowledge Management approach using LSI and Domain specific Ontologies", FLAIRS-01 Proceedings, 2001, pp. 300-302.

Lyon J., Design considerations in replicated database systems for disaster protection, COMPCON 1988, Feb. 29, 1988, pp. 428-430.

Microsoft Corporation, "Microsoft Exchange Server: Best Practices for Exchange Database Management," 1998.

Park, et al., "An Efficient Logging Scheme for Recoverable Distributed Shared Memory Systems", IEEE, 1997, 9 pages.

Rosenblum et al., "The Design and Implementation of a Log-Structure File System," Operating Systems Review SIGOPS, vol. 25, No. 5, New York, US, pp. 1-15 (May 1991).

The Oracle8 Replication Manual, Part No. A58245-01; Chapters 1-2; Dec. 1, 1997; obtained from website: http://download-west.oracle.com/docs/cd/A64702_01/doc/server.805/a58245/toc.htm on May 20, 2009.

Veritas Software Corporation, "Veritas Volume Manager 3.2, Administrator's Guide," Aug. 2001, 360 pages.

Wiesmann M, Database replication techniques: a three parameter classification, Oct. 16, 2000, pp. 206-215.

Final Office Action for Japanese Application No. 2003531581, Mail Date Mar. 24, 2009, 6 pages.

International Search Report and Written Opinion dated Nov. 13, 2009, PCT/US2007/081681.

First Office Action for Japanese Application No. 2003531581, Mail Date Jul. 8, 2008, 8 pages.

International Preliminary Report on Patentability, PCT Application No. PCT/US2009/066880, mailed Jun. 23, 2011, in 9 pages.

International Search Report and Written Opinion issued in PCT Application No. PCT/US2011/030396, mailed Jul. 18, 2011, in 20 pages.

International Search Report and Written Opinion issued in PCT Application No. PCT/US2011/38436, mailed Sep. 21, 2011, in 18 pages.

Canadian Office Action dated Sep. 24, 2012, Application No. 2,632,935, 2 pages.

European Examination Report; Application No. 06848901.2, Apr. 1, 2009, pp. 7.

Examiner's First Report; Application No. 2006331932, May 11, 2011 in 2 pages.

Canadian Office Action dated Dec. 29, 2010, Application No. CA2546304.

Examiner's Report for Australian Application No. 2003279847, Dated Dec. 9, 2008, 4 pages.

First Office Action in Canadian application No. 2,632,935 dated Feb. 16, 2012, in 5 pages.

International Search Report dated May 15, 2007, PCT/US2006/048273.

Second Examination Report in EU Appl. No. 06 848 901.2-2201 dated Dec. 3, 2010.

International Search Report and Written Opinion dated Mar. 25, 2010, PCT/US2009/066880.

International Preliminary Report on Patentability and Written Opinion in PCT/US2011/030396 mailed Oct. 2, 2012.

International Preliminary Report on Patentability and Written Opinion in PCT/US2011/038436 mailed Dec. 4, 2012.

International Search Report dated Dec. 28, 2009, PCT/US204/038324.

(56) References Cited

OTHER PUBLICATIONS

International Search Report and Written Opinion dated Jan. 11, 2006, PCT/US2004/038455.

Exam Report in Australian Application No. 2009324800 dated Jun. 17, 2013.

U.S. Appl. No. 60/519,876, filed Nov. 13, 2003, Prahlad, et. al., System And Method For Performing A Snapshot And For Restoring Data, Now Expired.

U.S. Appl. No. 60/519,576, filed Nov. 13, 2003, Prahlad, et. al., System And Method For Performing An Image Level Snapshot And For Restoring Partial Volume Data, Now Expired.

U.S. Appl. No. 11/672,926, filed Feb. 8, 2007, Prahlad, et. al., System And Method For Performing An Image Level Snapshot And For Restoring Partial Volume Data, Now Abandoned.

U.S. Appl. No. 61/121,418, filed Dec. 10, 2008, Ngo, Systems and Methods for Managing Replicated Database Data, Now Expired.

U.S. Appl. No. 61/121,438, filed Dec. 10, 2008, Agrawal, et al., Systems and Methods for Performing Discrete Data Replication, Now Expired.

U.S. Appl. No. 12/712,245, filed Feb. 25, 2010, Ngo, et al., Systems And Methods For Resynchronizing Information, Abandoned.

U.S. Appl. No. 14/138,599, filed Dec. 23, 2013, Prahlad, et. al., System And Method For Performing An Image Level Snapshot And For Restoring Partial Volume Data.

U.S. Appl. No. 14/138,666, filed Dec. 23, 2013, Erofeev, Rolling Cache Configuration For A Data Replication System.

U.S. Appl. No. 14/193,945, filed Feb. 28, 2014, Ngo, Systems And Methods For Managing Replicated Database Data.

U.S. Appl. No. 14/261,789, filed Apr. 25, 2014, Kottomtharayil, Systems And Methods For Performing Replication Copy Storage Operations.

U.S. Appl. No. 14/269,506, filed May 5, 2014, Ngo, Systems and Methods for Continuous Data Replication.

* cited by examiner

SYSTEMS AND METHODS FOR RESYNCHRONIZING INFORMATION

INCORPORATION BY REFERENCE TO ANY PRIORITY APPLICATIONS

This application is a continuation of U.S. application Ser. No. 11/640,024, filed Dec. 15, 2006, which claims priority to provisional application No. 60/752,201 filed Dec. 19, 2005. The entirety of each of the foregoing applications is hereby incorporated by reference.

This application is related to the following patents and pending applications, each of which is hereby incorporated herein by reference in its entirety:

Application Ser. No. 60/752,203 titled "Systems and Methods for Classifying and Transferring Information in a Storage Network" filed Dec. 19, 2005;

Application Ser. No. 60/752,198 titled "Systems and Methods for Granular Resource Management in a Storage Network" filed Dec. 19, 2005;

Application Ser. No. 11/313,224 titled "Systems and Methods for Performing Multi-Path Storage Operations" filed Dec. 19, 2005;

Application Ser. No. 60/752,196 titled "System and Method for Migrating Components in a Hierarchical Storage Network" filed Dec. 19, 2005.

Application Ser. No. 60/752,202 titled "Systems and Methods for Unified Reconstruction of Data in a Storage Network" filed Dec. 19, 2005;

Application Ser. No. 60/752,197 titled "Systems and Methods for Hierarchical Client Group Management" filed Dec. 19, 2005.

BACKGROUND OF THE INVENTION

The invention disclosed herein relates generally to performing data transfer operations in a data storage system. More particularly, the present invention relates to facilitating data synchronization between a source and destination device in a storage operation system.

Performing data synchronization is an important task in any system that processes and manages data. Synchronization is particularly important when a data volume residing in one location in a system is to be replicated and maintained on another part of the system. Replicated data volumes may be used, for example, for backup repositories, data stores, or in synchronous networks which may utilize multiple workstations requiring identical data storage.

File replication may include continually capturing write activity on a source computer and transmitting this write activity from the source computer to a destination or target computer in real-time or near real-time. A first step in existing file replication systems, as illustrated in FIG. 1A, is a synchronization process to ensure that the source data 22 at a source storage device and the destination data 24 at a destination storage device are the same. That is, before a destination computer 28 may begin storing write activity associated with the source data 22 at a source computer 26, the system 20 needs to first ensure that the previously written source data 22 is stored at the destination computer 28.

Problems in existing synchronization processes may occur as a result of low or insufficient bandwidth in a network connection 30 over which the source and destination computers 26, 28 communicate. Insufficient bandwidth over the connection 30 ultimately causes bottlenecks and network congestion. For example, if the rate of change of data at the source computer 26 is greater than the bandwidth available on the network connection 30, data replication may not occur since data at the source computer 26 will continue to change at a faster rate than it can be updated at the destination computer 28. Therefore, the attempts to synchronize the source and destination computers 26, 28 may continue indefinitely without success and one set of data will always lag behind the other.

Additional synchronization problems may arise due to hardware failure. If either the source computer 26 or the destination computer 28 were to fail, become unavailable, or have a failure of one of its storage components, application data may still be generated without system 20 being able to replicate the data to the other storage device. Neither computers 26 or 28 possess means of tracking data changes during such a failure. Other possible sources of disruption of replication operations in existing systems may include disrupted storage paths, broken communication links or exceeding the storage capacity of a storage device.

Additionally, some existing synchronization systems maintain continuity across multiple storage volumes using a wholesale copy routine. Such a routine entails periodically copying the most or all contents of a storage volume across the network to replace all the previous replication data. A storage policy or network administrator may control the operations and determine the frequency of the storage operation. Copying the entire contents of a storage volume across a network to a replication storage volume may be inefficient and can overload the network between the source computer 26 and the destination computer 28. Copying the entire volume across the network connection 30 between the two computers causes the connection 30 to become congested and unavailable for other operations or to other resources, which may lead to hardware or software operation failure, over-utilization of storage and network resources and lost information. A replication operation as described above may also lack the capability to encrypt or secure data transmitted across the network connection 30. A replication operation that takes place over a public network, such as the Internet, or publicly accessible wide area network ("WAN"), can subject the data to corruption or theft.

SUMMARY OF THE INVENTION

In accordance with some aspects of the present invention, a method of synchronizing data files with a storage operation between a first and a second storage device is provided. The method may include storing first data files associated with the first storage device to a storage medium, whereby the first data files include first data records. The storage medium may then be transferred to the second storage device. The first data files from the storage medium may be stored on the second storage device. The second data records from the first storage device may be received, and the first and second data records may be compared. The first data files at the second storage device may be updated based on the comparison of the first and second data records.

In accordance with other embodiments of the present invention, a method of synchronizing data after an interruption of data transfer between a first and a second storage device is provided. The method may include detecting an interruption in the data transfer between the first and the second storage device, and comparing first logged data records in a first data log associated with the first storage device with second logged records in a second data log associated with the second storage device. Updated data files from the first storage device may then be sent to the second storage device based on comparison the first and the second logged records.

One embodiment of the present invention includes a method of synchronizing data between a first and second storage device. The method may include identifying a first set of data on a first storage device for replication and capture the set of data in a first log entry. Changes to the first set of data may be determined and recorded as a second set data in a suitable log or data structure for recording such data. Next, the first and second set of data may be transmitted to the second storage device and any changes replicated in the second storage device.

Another embodiment of the present invention includes a method of synchronizing data after an interruption of data transfer between a first and a second storage device. When an interruption in the data transfer between the first and the second storage device is detected, the first logged data records in a first data log associated with the first storage device are compared with second logged records in a second data log associated with the second storage device. Updated data files from the first storage device are then sent to the second storage device based on comparing the first and the second logged records.

In yet another embodiment, a method of replicating data on an electronic storage system network is presented. A set of data, including a record identifier, is stored on a first storage device and copied to an intermediary storage device. The set of data from the intermediary storage device may then be transferred to a third storage device. The record identifier of the set of data on the third storage device may then be compared to the record identifier of the set of data on the first storage device. The set of data on the third storage device is updated upon detection of non-identical record identifiers, wherein the updated data files are transmitted across the storage network.

In another embodiment, a system for replicating data on an electronic storage network is presented. The system includes a first and second storage device, a first log, for tracking changes to data stored on the first storage device, and a replication manager module. The replication manager module transmits updated data from the first log to the second storage device.

In another embodiment, a computer-readable medium having stored thereon a plurality of sequences of instructions is presented. When executed by one or more processors the sequences cause an electronic device to store changes to data on a first storage device in a first log including record identifiers. Updated data is transmitted from the first log to a second log on a second storage device where the record identifier of the data from the first log is compared to the record identifier of the data from the second log. The second storage device is updated with the updated data upon detecting a difference in the record identifiers.

In another embodiment, a computer-readable medium having stored thereon a plurality of sequences of instructions is presented. When executed by one or more processors the sequences cause an electronic device to detect a failure event in a data replication operation between first and second storage devices. Updates of a first set of data are stored in the first storage device. A second set of data detailing the updates to the first set of data is logged. The second set of data also includes a record identifier which is compared to a record identifier of the second storage device. The updates to the first set of data, identified by the second set of data, are replicated on the second storage device.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENT

Detailed embodiments of the present invention are disclosed herein, however, it is to be understood that the disclosed embodiments are merely exemplary of the invention, which may be embodied in various forms. Therefore, specific functional details disclosed herein are not to be interpreted as limiting, as a representative basis for teaching one skilled in the art to variously employ the present invention in any appropriately detailed embodiment.

Figure 1:
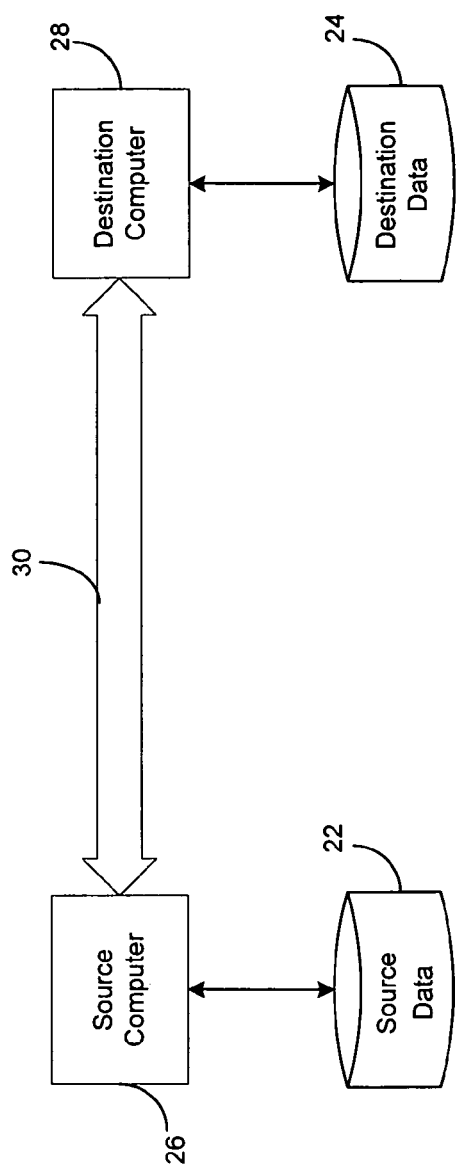
FIG. 1 is a block diagram of a prior art system.
Figure 2:
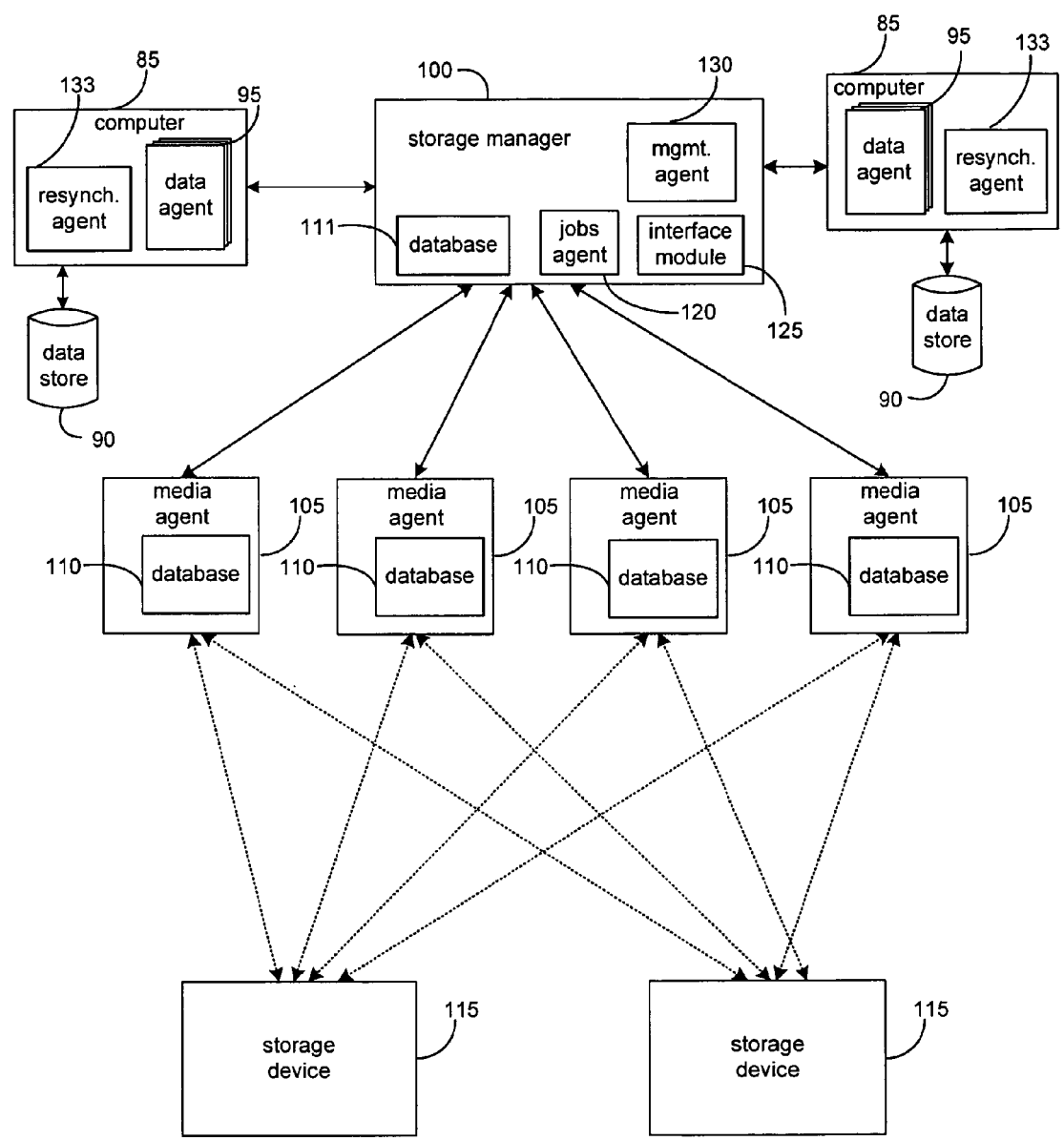
FIG. 2 is a block diagram of a system for performing storage operations on electronic data in a computer network according to an embodiment of the invention.

With reference to FIGS. 2-7, exemplary aspects of embodiments and features of the present invention are presented. Turning now to FIG. 2, a block diagram of a storage operation cell 50 that may perform storage operations on electronic data in a computer network in accordance with an embodiment of the present invention is illustrated. As shown, storage operation cell 50 may generally include a storage manager 100, a data agent 95, a media agent 105, a storage device 115, and, may include certain other components such as a client computer 85, a data or information store 90, databases 110,111, a jobs agent 120, an interface module 125, a management agent 130, and a resynchronization agent 133. Such system and elements thereof are exemplary of a modular storage management system such as the CommVault QiNetix™ system, and also the CommVault GALAXY™ backup system, available from CommVault Systems, Inc. of Oceanport, N.J., and further described in U.S. Pat. No. 7,035,880, which is incorporated herein by reference in its entirety.

A storage operation cell, such as cell 50, may generally include combinations of hardware and software components associated with performing storage operations on electronic data. Exemplary storage operation cells according to embodiments of the invention may include, as further described herein, CommCells as embodied in the QNet storage management system and the QiNetix storage management system by CommVault Systems of Oceanport, N.J. According to some embodiments of the invention, storage operations cell 50 may be related to backup cells and provide some or all of the functionality of backup cells as described in application Ser. No. 10/877,831 which is hereby incorporated by reference in its entirety.

Storage operations performed by storage operation cell 50 may include creating, storing, retrieving, and migrating primary data copies and secondary data copies (which may include, for example, snapshot copies, backup copies, HSM (Hierarchical Storage Management) copies, archive copies, and other types of copies of electronic data). Storage operation cell 50 may also provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information. The use of integrated management consoles may provide a unified view of the data operations across the network.

A unified view of the data operations collected across the entire storage network may provide an advantageous benefit in the management of the network. The unified view may present the system, or system administrator with a broad view of the utilized resources of the network. Presenting such data to one centralized management console may allow for a more complete and efficient administration of the available resources of the network. The storage manager 100, either via a preconfigured policy or via a manual operation from a system administrator, can reallocate resources to more efficiently run the network. Data paths from storage operation cells may be re-routed to avoid areas of the network which are congested by taking advantage of underutilized data paths or operation cells. Additionally, should a storage operation cell arrive at or exceed a database size maximum, storage device capacity maximum or fail outright, several routes of redundancy may be triggered to ensure the data arrives at the location for which it was intended. A unified view may provide the manager with a collective status of the entire network allowing the system to adapt and reallocate the many resources of the network for faster and more efficient utilization of those resources.

In some embodiments, storage operations may be performed according to a storage policy. A storage policy generally may be a data structure or other information source that includes a set of preferences and other storage criteria for performing a storage operation and/or other functions that relate to storage operation. The preferences and storage criteria may include, but are not limited to, a storage location, relationships between system components, network pathway to utilize, retention policies, data characteristics, compression or encryption requirements, preferred system components to utilize in a storage operation, and other criteria relating to a storage operation. For example, a storage policy may indicate that certain data is to be stored in a specific storage device, retained for a specified period of time before being aged to another tier of secondary storage, copied to secondary storage using a specified number of streams, etc. In one embodiment, a storage policy may be stored in a storage manager database 111. Alternatively, certain data may be stored to archive media as metadata for use in restore operations or other storage operations. In other embodiments, the data may be stored to other locations or components of the system.

A schedule policy specifies when and how often to perform storage operations and may also specify performing certain storage operations (i.e. replicating certain data) on sub-clients of data including how to handle those sub-clients. A sub-client may represent static or dynamic associations of portions of data of a volume and are generally mutually exclusive. Thus, a portion of data may be given a label and the association is stored as a static entity in an index, database or other storage location used by the system. Sub-clients may also be used as an effective administrative scheme of organizing data according to data type, department within the enterprise, storage preferences, etc. For example, an administrator may find it preferable to separate e-mail data from financial data using two different sub-clients having different storage preferences, retention criteria, etc.

Storage operation cells may contain not only physical devices, but also may represent logical concepts, organizations, and hierarchies. For example, a first storage operation cell 50 may be configured to perform HSM operations, such as data backup or other types of data migration, and may include a variety of physical components including a storage manager 100 (or management agent 130), a media agent 105, a client component 85, and other components as described herein. A second storage operation cell may contain the same or similar physical components, however, it may be configured to perform storage resource management ("SRM") operations, such as monitoring a primary data copy or performing other known SRM operations.

In one embodiment a data agent 95 may be a software module or part of a software module that is generally responsible for archiving, migrating, and recovering data from client computer 85 stored in an information store 90 or other memory location. Each computer 85 may have at least one data agent 95 and a resynchronization agent 133. Storage operation cell 50 may also support computers 85 having multiple clients (e.g., each computer may have multiple applications, with each application considered as either a client or sub-client).

In some embodiments, the data agents 95 may be distributed between computer 85 and the storage manager 100 (and any other intermediate components (not explicitly shown)) or may be deployed from a remote location or its functions approximated by a remote process that performs some or all of the functions of the data agent 95. The data agent 95 may also generate metadata associated with the data that it is generally responsible for replicating, archiving, migrating, and recovering from client computer 85. This metadata may be appended or embedded within the client data as it is transferred to a backup or secondary storage location, such as a replication storage device, under the direction of storage manager 100.

One embodiment may also include multiple data agents 95, each of which may be used to backup, migrate, and recover data associated with a different application. For example, different individual data agents 95 may be designed to handle MICROSOFT EXCHANGE® data, MICROSOFT SHARE-POINT data or other collaborative project and document management data, LOTUS NOTES® data, MICROSOFT WINDOWS 2000® file system data, MICROSOFT Active Directory Objects data, and other types of data known in the art. Alternatively, one or more generic data agents 95 may be used to handle and process multiple data types rather than using the specialized data agents described above.

In an embodiment utilizing a computer 85 having two or more types of data, one data agent 95 may be used for each data type to archive, migrate, and restore the client computer 85 data. For example, to backup, migrate, and restore all of the data on a MICROSOFT EXCHANGE 2000® server, the computer 85 may use one MICROSOFT EXCHANGE 2000® Mailbox data agent to backup the EXCHANGE 2000® mailboxes, one MICROSOFT EXCHANGE 2000® Database data agent to backup the EXCHANGE 2000® databases, one MICROSOFT EXCHANGE 2000® Public Folder data agent to backup the EXCHANGE 2000® Public Folders, and one MICROSOFT WINDOWS 2000® File System data agent to backup the file system of the computer 85. These data agents 95 would be treated as four separate data agents 95 by the system even though they reside on the same computer 85.

In an alternative embodiment, one or more generic data agents 95 may be used, each of which may be capable of handling two or more data types. For example, one generic data agent 95 may be used to back up, migrate and restore MICROSOFT EXCHANGE 2000® Mailbox data and MICROSOFT EXCHANGE 2000® Database data while another generic data agent may handle MICROSOFT EXCHANGE 2000® Public Folder data and MICROSOFT WINDOWS 2000® File System data.

While the illustrative embodiments described herein detail data agents implemented, specifically or generically, for Microsoft applications, one skilled in the art should recognize that other application types (i.e. Oracle data, SQL data, Lotus Notes, etc.) may be implemented without deviating from the scope of the present invention.

Resynchronization agent 133 may initiate and manage system backups, migrations, and data recovery. Although resynchronization agent 133 is shown as being part of each client computer 85, it may exist within the storage operation cell 50 as a separate module or may be integrated with or part of a data agent (not shown). In other embodiments, resynchronization agent 133 may be resident on a separate host. As a separate module, resynchronization agent 133 may communicate with all or some of the software modules in storage operation cell 50. For example, resynchronization agent 133 may communicate with storage manager 100, other data agents 95, media agents 105, and/or storage devices 115.

In one embodiment, the storage manager 100 may include a software module (not shown) or other application that may coordinate and control storage operations performed by storage operation cell 50. The storage manager 100 may communicate with the elements of storage operation cell 50 including computers 85, data agents 95, media agents 105, and storage devices 115.

In one embodiment the storage manager 100 may include a jobs agent 120 that monitors the status of some or all storage operations previously performed, currently being performed, or scheduled to be performed by the storage operation cell 50. The jobs agent 120 may be linked with an interface module 125 (typically a software module or application). The interface module 125 may include information processing and display software, such as a graphical user interface ("GUI"), an application program interface ("API"), or other interactive interface through which users and system processes can retrieve information about the status of storage operations. Through the interface module 125, users may optionally issue instructions to various storage operation cells 50 regarding performance of the storage operations as described and contemplated by embodiment of the present invention. For example, a user may modify a schedule concerning the number of pending snapshot copies or other types of copies scheduled as needed to suit particular needs or requirements. As another example, a user may utilize the GUI to view the status of pending storage operations in some or all of the storage operation cells in a given network or to monitor the status of certain components in a particular storage operation cell (e.g., the amount of storage capacity left in a particular storage device). As a further example, the interface module 125 may display the cost metrics associated with a particular type of data storage and may allow a user to determine the overall and target cost metrics associated with a particular data type. This determination may also be done for specific storage operation cells 50 or any other storage operation as predefined or user-defined (discussed in more detail below).

One embodiment of the storage manager 100 may also include a management agent 130 that is typically implemented as a software module or application program. The management agent 130 may provide an interface that allows various management components in other storage operation cells 50 to communicate with one another. For example, one embodiment of a network configuration may include multiple cells adjacent to one another or otherwise logically related in a WAN or LAN configuration (not explicitly shown). With this arrangement, each cell 50 may be connected to the other through each respective management agent 130. This allows each cell 50 to send and receive certain pertinent information from other cells 50 including status information, routing information, information regarding capacity and utilization, etc. These communication paths may also be used to convey information and instructions regarding storage operations.

In an illustrative embodiment, the management agent 130 in the first storage operation cell 50 may communicate with a management agent 130 in a second storage operation cell regarding the status of storage operations in the second storage operation cell. Another illustrative example may include a first management agent 130 in a first storage operation cell 50 that may communicate with a second management agent in a second storage operation cell to control the storage manager (and other components) of the second storage operation cell via the first management agent 130 contained in the storage manager 100 of the first storage operation cell.

Another illustrative example may include the management agent 130 in the first storage operation cell 50 communicating directly with and controlling the components in the second storage management cell 50, bypassing the storage manager 100 in the second storage management cell. In an alternative embodiment, the storage operation cells may also be organized hierarchically such that hierarchically superior cells control or pass information to hierarchically subordinate cells or vice versa.

The storage manager 100 may also maintain, in an embodiment, an index cache, a database, or other data structure 111. The data stored in the database 111 may be used to indicate logical associations between components of the system, user preferences, management tasks, Storage Resource Management (SRM) data, Hierarchical Storage Management (HSM) data or other useful data. The SRM data may, for example, include information that relates to monitoring the health and status of the primary copies of data (e.g., live or production line copies). HSM data may, for example, be related to information associated with migrating and storing secondary data copies including archival volumes to various storage devices in the storage system. As further described herein, some of this information may be stored in a media agent database 110 or other local data store. For example, the storage manager 100 may use data from the database 111 to track logical associations between the media agents 105 and the storage devices 115.

From the client computer 85, resynchronization agent 133 may maintain and manage the synchronization of data both within the storage operation cell 50, and between the storage operation cell 50 and other storage operation cells. For example, resynchronization agent 133 may initiate and manage a data synchronization operation between data store 90 and one or more of storage devices 115. Resynchronization agent 133 may also initiate and manage a storage operation between two data stores 90 and associated storage devices, each in a separate storage operation cell implemented as primary storage. Alternatively, resynchronization agent 133 may be implemented as a separate software module that communicates with the client 85 for maintaining and managing resynchronization operations.

In one embodiment, a media agent 105 may be implemented as a software module that conveys data, as directed by the storage manager 100, between computer 85 and one or more storage devices 115 such as a tape library, a magnetic media storage device, an optical media storage device, or any other suitable storage device. Media agents 105 may be linked with and control a storage device 115 associated with a particular media agent. In some embodiments, a media agent 105 may be considered to be associated with a particular storage device 115 if that media agent 105 is capable of routing and storing data to particular storage device 115.

In operation, a media agent 105 associated with a particular storage device 115 may instruct the storage device to use a robotic arm or other retrieval means to load or eject a certain storage media, and to subsequently archive, migrate, or restore data to or from that media. The media agents 105 may communicate with the storage device 115 via a suitable communications path such as a SCSI (Small Computer System Interface), fiber channel or wireless communications link or other network connections known in the art such as a WAN or LAN. Storage device 115 may be linked to a data agent 105 via a Storage Area Network ("SAN").

Each media agent 105 may maintain an index cache, a database, or other data structure 110 which may store index data generated during backup, migration, and restore and other storage operations as described herein. For example, performing storage operations on MICROSOFT EXCHANGE® data may generate index data. Such index data provides the media agent 105 or other external device with a fast and efficient mechanism for locating the data stored or backed up. In some embodiments, storage manager database 111 may store data associating a computer 85 with a particular media agent 105 or storage device 115 as specified in a storage policy. The media agent database 110 may indicate where, specifically, the computer data is stored in the storage device 115, what specific files were stored, and other information associated with storage of the computer data. In some embodiments, such index data may be stored along with the data backed up in the storage device 115, with an additional copy of the index data written to the index cache 110. The data in the database 110 is thus readily available for use in storage operations and other activities without having to be first retrieved from the storage device 115.

In some embodiments, certain components may reside and execute on the same computer. For example, a client computer 85 including a data agent 95, a media agent 105, or a storage manager 100 coordinates and directs local archiving, migration, and retrieval application functions as further described in U.S. Pat. No. 7,035,880. Thus, client computer 85 can function independently or together with other similar client computers 85.

Figure 3A:
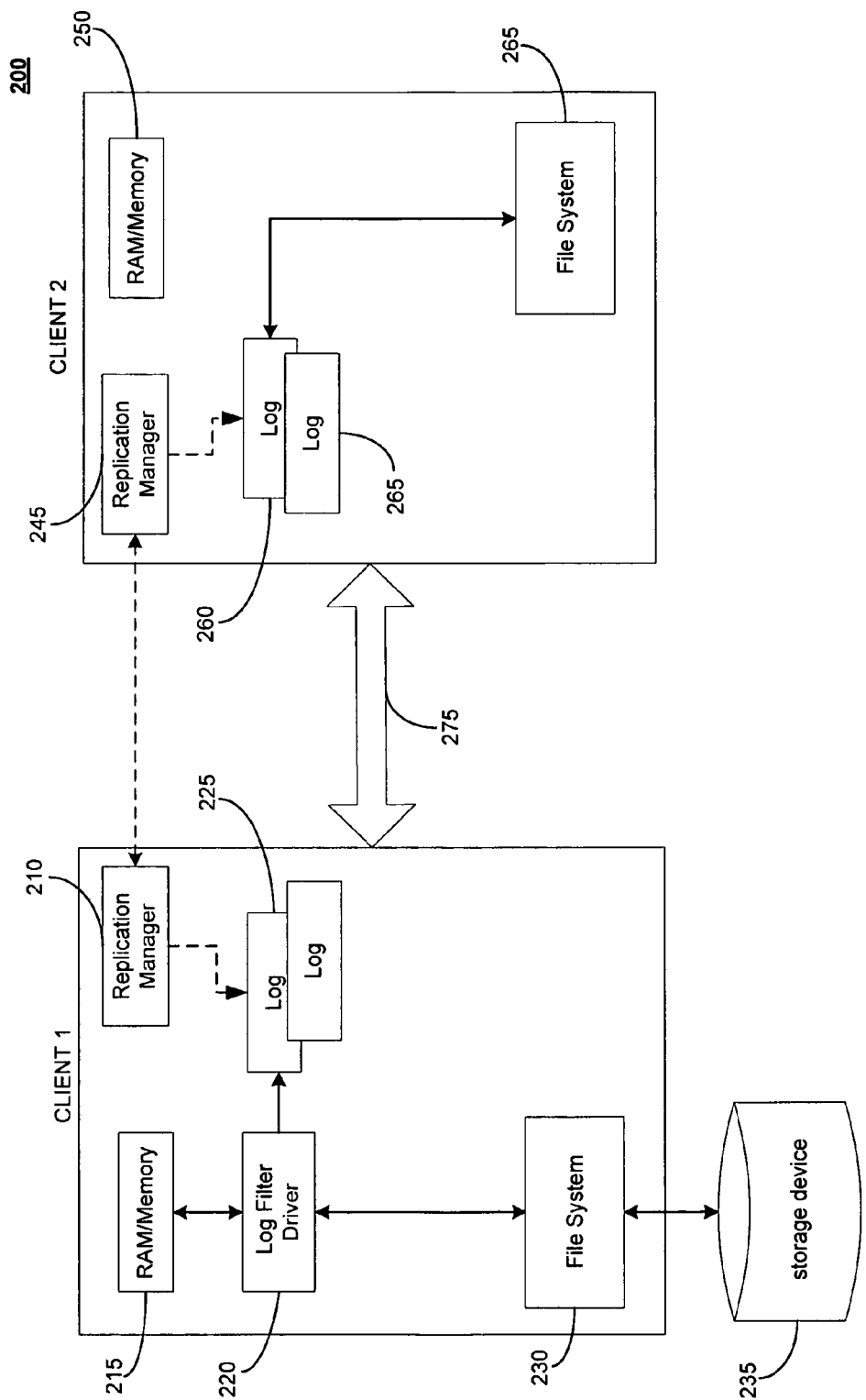
FIG. 3A is a block diagram of storage operation system components utilized during synchronization operations according to an embodiment of the invention.

FIG. 3A illustrates a block diagram of a system 200 of system storage operation system components that may be utilized during synchronization operations on electronic data in a computer network in accordance with an embodiment of the present invention. The system 200 may comprise CLIENT 1 and CLIENT 2 for, among other things, replicating data. CLIENT 1 may include a replication manager 210, a memory device 215, a log filter driver 220, a log 225, a file system 230, and a link to a storage device 235. Similarly, CLIENT 2 may include a replication manager 245, a memory device 250, a log filter driver 255, a log 260, a file system 265, and a storage device. Additional logs 261 may also reside on CLIENT 2 in some embodiments.

In one embodiment, replication manager 210 may be included in resynchronization agent 133 (FIG. 2). Replication manager 210, in one embodiment, may manage and coordinate the replication and transfer of data files between storage device 235 and a replication volume. As previously described in relation to FIG. 2, resynchronization agent 133 may be included in client computer 85. In such an embodiment, replication manager 210 may reside within resynchronization agent 133 (FIG. 2) in a client computer. In other embodiments, the replication manager 210 may be part of a computer operating system (OS). In such embodiments, for example, client computer 85 (FIG. 2) may communicate and coordinate the data replication processes with the OS.

In the exemplary embodiment of FIG. 3A, the replication process between CLIENT 1 and CLIENT 2 in system architecture 200 may occur, for example, during a data write operation in which storage data may be transferred from a memory device 215 to a log filter driver 220. Log filter driver 220 may, among other things, filter or select specific application data or other data that may be parsed as part of the replication process that is received from the memory device 215. For example, ORACLE data, SQL data, or MICROSOFT EXCHANGE data may be selected by the log filter driver 220. The log filter driver 220 may, among other things, include a specific application or module that resides on the input/output ("I/O") stack between the memory device 215 and the storage device 235. Once write data passes through the memory device 215 towards the file system 230, the write data is intercepted and processed by the log filter driver 220. As the write data is intercepted by the log filter driver 220, it is also received by the file system 230. The file system 230 may be responsible for managing the allocation of storage space on the storage device 235. Therefore, the file system 230 may facilitate storing the write data to the storage device 235 associated with CLIENT 1.

In order to replicate the filtered write data that is received from the memory device 215, the log filter driver 220 may send filtered write data to the log 225. The log 225 may include metadata in addition to write data, whereby the write data entries in log 225 may include a data format 300, such as that illustrated in FIG. 3B. Metadata may include information, or data, about the data stored on the system. Metadata, while generally not including the substantive operational data of the network is useful in the administration, security, maintenance and accessibility of operational data. Examples of metadata include files size, edit times, edit dates, locations on storage devices, version numbers, encryption codes, restrictions on access or uses, and tags of information that may include an identifier for editors. These are mere examples of common usages of metadata. Any form of data that describes or contains attributes or parameters of other data may be considered metadata.

Figure 3B:
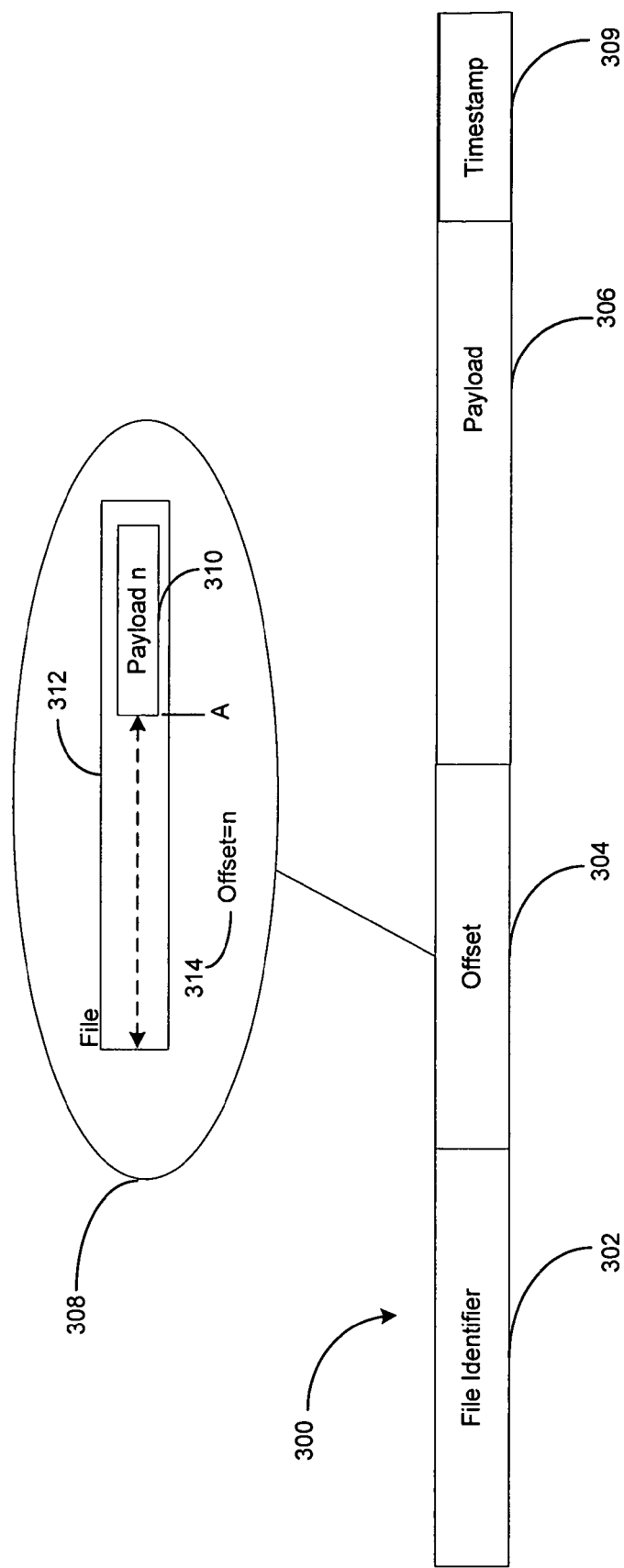
FIG. 3B is an exemplary data format associated with logged data entries according to an embodiment of the invention.

As illustrated in FIG. 3B, the data format of the logged write data entries in the log 225 may include, for example, a file identifier field(s) 302, an offset 304, a payload region 306, and a timestamp 309. Identifier 302 may include information associated with the write data (e.g., file name, path, size, computer device associations, user information, etc.). Timestamp field 309 may include a timestamp referring to the time associated with its log entry, and in some embodiments may include a indicator, which may be unique, such as USN.

Offset 304 may indicate the distance from the beginning of the file to the position of the payload data. For example, as indicated by the illustrative example 308, the offset may indicate the distance of the payload 310 from the beginning of the file 312. Thus, using the offset 314 (e.g., offset=n), only the payload 310 (e.g., payload n) that requires replicating is sent from storage device 235 (FIG. 3A) to the replication volume storage device. P Thereby replicating only that portion of the data that has changed. The replication process may be sent over the network, for example, the communication link 275 (FIG. 3A) to another client, CLIENT 2.

As indicated in FIG. 3A, at CLIENT 2, write data associated with the log 225 of CLIENT 1 may be received by the log 260 of CLIENT 2 via the communication link 275. The write data may then be received by the file system 265 of CLIENT 2 prior to being stored on the replication volume at the storage device (the replication volume).

Referring to FIG. 3A, changes captured by filter driver 220 on CLIENT 1 may later be used to replicate the write data entries utilizing the log 225, if, for example, a communication failure occurs between CLIENT 1 and CLIENT 2 due to a network problem associated with communication link 275. If the failure is of limited duration the log 225 will not be overwritten by additional data being logged. Therefore, provided that during a network failure, the log 225 has enough storage capacity to store recent entries associated with the write data, the log 225 may be able to successfully send the recent write data entries to a replication volume upon restoration of communication.

The write data entries in the log 225 of CLIENT 1 may accumulate over time. Replication manager 210 of CLIENT 1 may periodically direct the write data entries of the log 225 to be sent to a storage device having the replication volume. During a network failure, however, the storage capacity of the log 225 may be exceeded as a result of recent logged entries associated with the write data. Upon such an occurrence, the log filter driver 220 may begin to overwrite the oldest entries associated with the write data. Replication of the write data associated with the overwritten entries may not be possible. Thus, the present embodiment allows for a full synchronization of data files between the storage device 235 and a replication volume which may be necessary to ensure the data volume in the storage device 235 associated with CLIENT 1 is replicated at the replication volume.

In one embodiment, the storage manager 100 (FIG. 2) may monitor and control the network resources utilized in the replication operations. Through a defined storage policy, or interactive interfacing with a system administrator, the storage manager 100 may reallocate network resources (e.g. storage operation paths, storage devices utilized, etc). Reallocating the resources of the network may alleviate the concentrated traffic and bottlenecks created by these types of situations in replication operations.

Figure 4A:
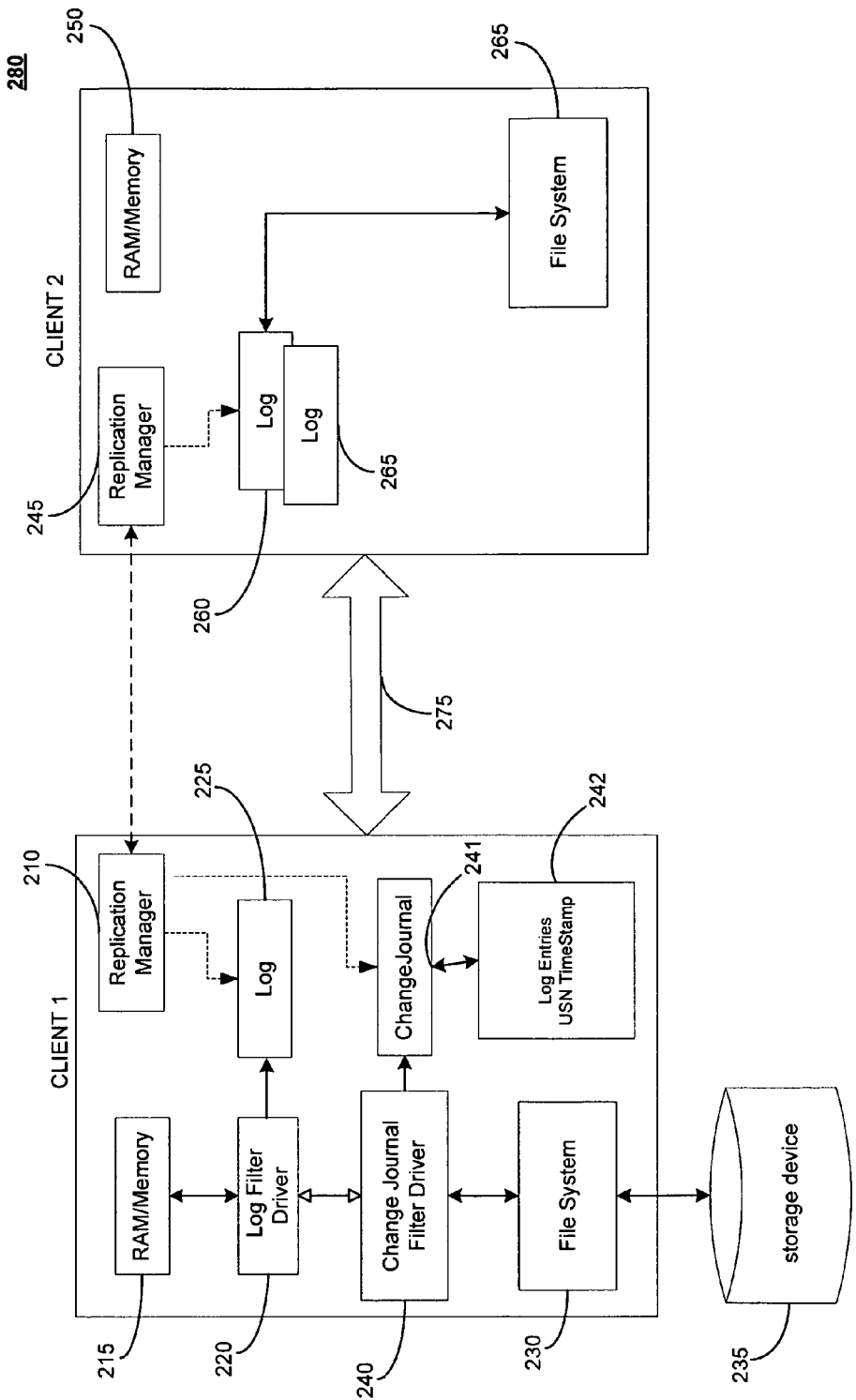
FIG. 4A is a block diagram of storage operation system components utilized during synchronization operations in accordance with another embodiment of the invention.

FIG. 4A illustrates a block diagram 280 of storage operation system components that may be utilized during synchronization operations on electronic data in a computer network in accordance with another embodiment of the present invention. System 280 is similar to system 200 (FIG. 3A) and use like reference numbers to designate generally like components. As shown, system 280 may include CLIENT 1 and CLIENT 2 for, among other things, replicating data. CLIENT 1 may include a replication manager 210, a memory device 215, a log filter driver 220, one or more log files 225, a change journal filter 240, a change journal 241, a file system 230, and a storage device 235. Similarly, CLIENT 2 may include a replication manager 245, a memory device 250, one or more log files 260, 261, and a file system 265. The one or more log files 260, 261 may be utilized for different application types, such as, SQL data, MICROSOFT EXCHANGE data, etc.

In one embodiment, the replication manager 210 may be included in the resynchronization agent 133 (FIG. 2). The replication manager 210, in one embodiment may manage and coordinate the replication of data files between storage device 235 and a replication volume. As previously described in relation to FIG. 2, resynchronization agent 133 may be included in client computer 85. In such an embodiment, the replication manager 210 may reside within resynchronization agent 133, in a client computer. In other embodiments, replication manager 210 may be part of a computer operating system (OS). In such embodiments, for example, the client computer 85 (FIG. 2) may communicate and coordinate the data replication processes with the OS.

In the exemplary embodiment of FIG. 4A, the replication process between CLIENT 1 and CLIENT 2 in the system architecture 280 may occur, for example, during a data write operation in which storage data may be transferred from the memory device 215 of CLIENT 1 to a storage device 235 via the file system 230. The write data from the memory 215 device, however, may be intercepted by the log filter driver 220. As previously described, the log filter driver 220 may, among other things, trap, filter or select intercepted application data received from memory 215. For example, ORACLE data, SQL data, or MICROSOFT EXCHANGE data may be selected by the log filter driver 220. Once the write data passes through and is captured by the log filter driver 220, the write data may be received by the change journal filter driver 240.

Change journal filter driver 240 may also create data records that reflect changes made to the data files (e.g., write activity associated with new file creation, existing file updates, file deletion, etc.) stored on the storage device 235. These data records, once selected by the change journal filter driver 240, may be stored as records in the change journal 241. The replication manager 210 may then utilize these change journal 241 record entries during replication operations if access to the log file 225 entries, which may have ordinarily facilitated the replication process as further described herein, is unavailable (e.g., corrupted, deleted, or overwritten entries). Write data may then be received at the file system 230 from the change journal filter driver 240, whereby the file system 230 may be responsible for managing the allocation of storage space and storage operations on the storage device 235, and copying/transferring data to the storage device 235.

In order to replicate the filtered write data that is received from the memory device 215, the log filter driver 220 may send write data filtered by the log filter driver 220 to the log 225. The log 225 may include metadata in addition to write data payloads, whereby the write data entries in the log 225 may include the data format 300, previously described and illustrated in relation to FIG. 3B.

As previously described in relation to the embodiments of FIGS. 3A and 3B, the present invention provides for replication operations during both normal and failure occurrences between CLIENT 1 and CLIENT 2 due to network problems (e.g., failure in communication link 275). In one embodiment, the filter driver 220 captures changes in the write data that may later be used to replicate write data entries utilizing the log 225, provided the failure is of limited duration and the log 225 goes not get overwritten. Therefore, provided that during a network failure, the log 220 has enough storage capacity to store recent entries associated with the write data, the log filter driver 220 may be able to successfully send the recent write data entries to the replication upon restoration of communication.

The write data entries in the log 225 of CLIENT 1 may accumulate over time. The replication manager 210 of CLIENT 1 may periodically direct the write data entries of the log 225 to be sent to the replication volume. During a network failure, however, the storage capacity of the log 225 may be exceeded as a result of recent logged entries associated with the write data. Replication of write data associated with the overwritten entries may not be possible. Thus, under these conditions, the change journal 241 entries captured by the change journal filter driver 240 may enable the replication of write data without the need for a full synchronization of data files between the storage devices 235 and a replication volume. As previously described, full synchronization may require a transfer of the entire storage volume stored at the storage device 235 linked to CLIENT 1 to the replication volume of CLIENT 2. The present embodiment is advantageous as a full synchronization operations may place a heavy burden on network resources, especially considering the large data volume that may reside on the storage device 235. In addition to the large data transfer requirement during this operation, other data transfer activities within the storage operation system may also create further network bottlenecks.

With the implementation of the change journal filter driver 240 and the change journal 241, the requirement for a full synchronization may be obviated. The changed data entries in change journal 241 may allow for the replication manager to selectively update the replicated data instead of requiring a full synchronization that may occupy valuable network resources better suited for other operations.

Figure 4B:
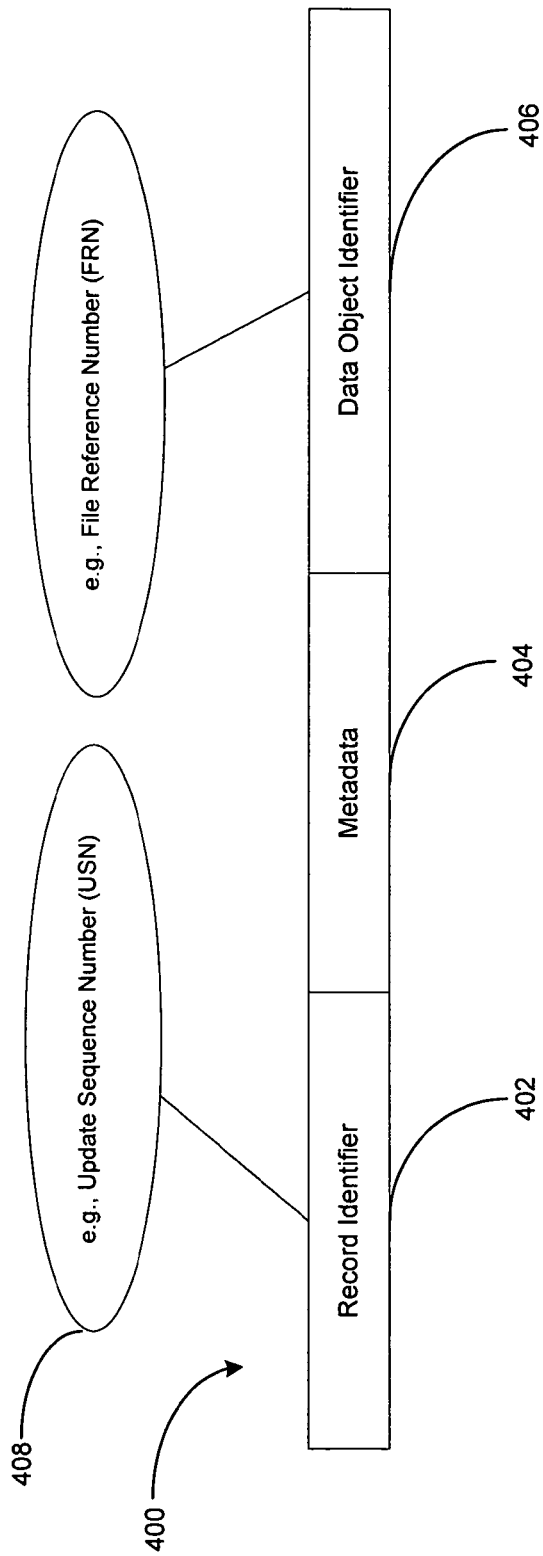
FIG. 4B is an exemplary data format associated with logged data record entries according to an embodiment of the invention.

FIG. 4B illustrates some of the data fields 400 associated with entries within the change journal log 241 according to an embodiment of the invention. The data fields 400 may include, for example, a record identifier 402 such as an Update Sequence Number (USN), metadata 404, and a data object identifier 406 such as a File Reference Number (FRN). The data object identifier 406 may include additional information associated with the write data (e.g., file name, path size, etc.). Each record logged or entered in change journal 241 via change journal filter driver 240 may have a unique record identifier number that may be located in the record identifier field 402. For example, this identifier may be a 64-bit identifier such as a USN number used in the MICROSOFT Windows® OS change journal system. Each of the records that are created and entered into the change journal 241 is assigned such a record identifier. In one embodiment, each of the assigned identifiers is sequentially incremented with the creation of a newly created record reflecting a change to the data of the client. For example, an assigned identifier (e.g., USN) associated with the most recent change to a file on the storage device may include the numerically greatest record identifier with respect to all previously created records, thereby indicating the most recent change. The metadata field 404 may include, among other things, a time stamp of the record, information associated with the sort of changes that have occurred to a file or directory (e.g., a Reason member), etc. In some embodiments, a FRN associated with the data object identifier 406 may include a 64-bit ID that uniquely identifies any file or directory on a storage volume such as that of the storage device 235 (FIG. 4A).

In accordance with an embodiment of the invention, as further described herein, the record identifier fields 402 (FIG. 4B) of each logged record entered in change journal 241 may be utilized to resynchronize replication operations in conjunction with replication managers 210, 245 and one or more of the log files 260, 261. Based on the recorded entries in change journal 241, the replication manager 210 of CLIENT 1 may coordinate the transfer of files that are to be replicated with replication manager 245 of CLIENT 2. This may be accomplished as follows. Change journal 241 logs all changes and assigns a USN or FRN to each log entry in log 242 (FIG. 4A). Each log entry may include a timestamp indicating its recordation in log 242. Periodically, replication manager 210 may send the most recent USN copied to log 242 to the destination. Next, change journal 241 may be queried for changes since the last USN copied, which indicates the difference between the log at the source and the log at the destination, and only those log entries are replicated. This may be thought of as "resynchronizing" CLIENT 1 and CLIENT 2.

Once the transfer of files has been coordinated by replication managers 210, 245, the designated files may be sent over communication link 275 to the one or more log files 260, 261. The files received are then forwarded from the one or more log files 260, 261 to the replication volume.

Figure 5:
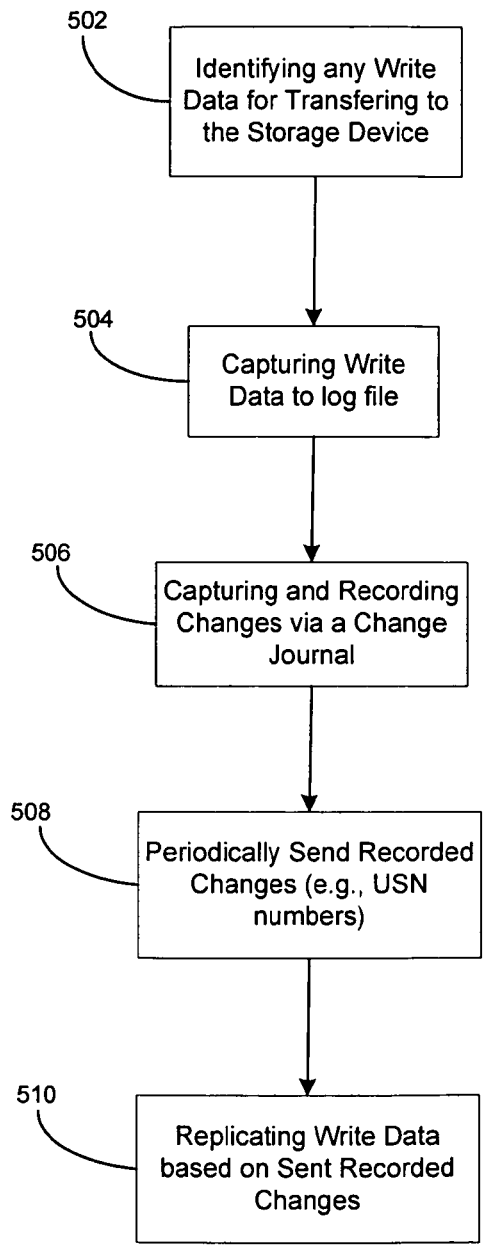
FIG. 5 is a flowchart illustrating some of the steps involved in replication according to an embodiment of the invention.

FIG. 5 is a flowchart 500 illustrating some of the steps involved in a replication process in a storage operation system under substantially normal operating conditions according to an embodiment of the invention. The replication process of FIG. 5 may be described with reference to system architecture 280 illustrated in FIG. 4A to facilitate comprehension. However, it will be understood this merely represents one possible embodiment of the invention and should not be construed to be limited to this exemplary architecture.

As shown, at step 502, it may be determined whether any write data (e.g., application specific data) is available for transfer to the storage device 235 of a first client, whereby the write data may require replication at the replication volume of a second client. If the write data (e.g., application data) requiring replication exists, it may be captured by the log filter driver 220 and logged in the log 225 (step 504). Additionally, through the use of another data volume filter driver, such as a MICROSOFT Change Journal filter driver, records identifying any changes to files or directories (e.g., change journal records) on the storage device 235 of the first client may be captured and stored in the change journal 241 (step 506).

In some embodiments, under the direction of the replication manager 210, the write data stored and maintained in the log 225 may be periodically (e.g., every 5 minutes) sent via a communications link 275, to the replication volume of the second client. In an alternative embodiment, under the direction of the replication manager 210, the write data stored in the log 225 may be sent via the communications link 275, to the replication volume when the quantity of data stored in the log 225 exceeds a given threshold. For example, when write data stored to the log 225 reaches a five megabyte (MB) capacity, all write data entries in the log 225 may be replicated to the second client.

Also, in some embodiments, under the direction of the replication manager 210, record identifiers (e.g., USN numbers) stored in the change journal 241 may also be periodically (e.g., every 5 minutes) sent via the communications link 275 to the replication manager 245 of the second client. The replication manager 245 may store these record identifiers in a log file at CLIENT 2, or at another memory index, or data structure (step 508). In other embodiments, under the direction of the replication manager 210, each record written to the change journal 241 may be directly sent via the communications link 275 to the replication manager 245.

At step 510, the record identifiers (e.g., USN numbers) sent via the communications link 275 and stored in the log file 260 may be compared with existing record identifiers. Based on a comparison between the greatest numerical value of a record identifier received at the log 260 and other record identifiers, replication data may be identified and replicated to the data volume of the second client.

Figure 6:
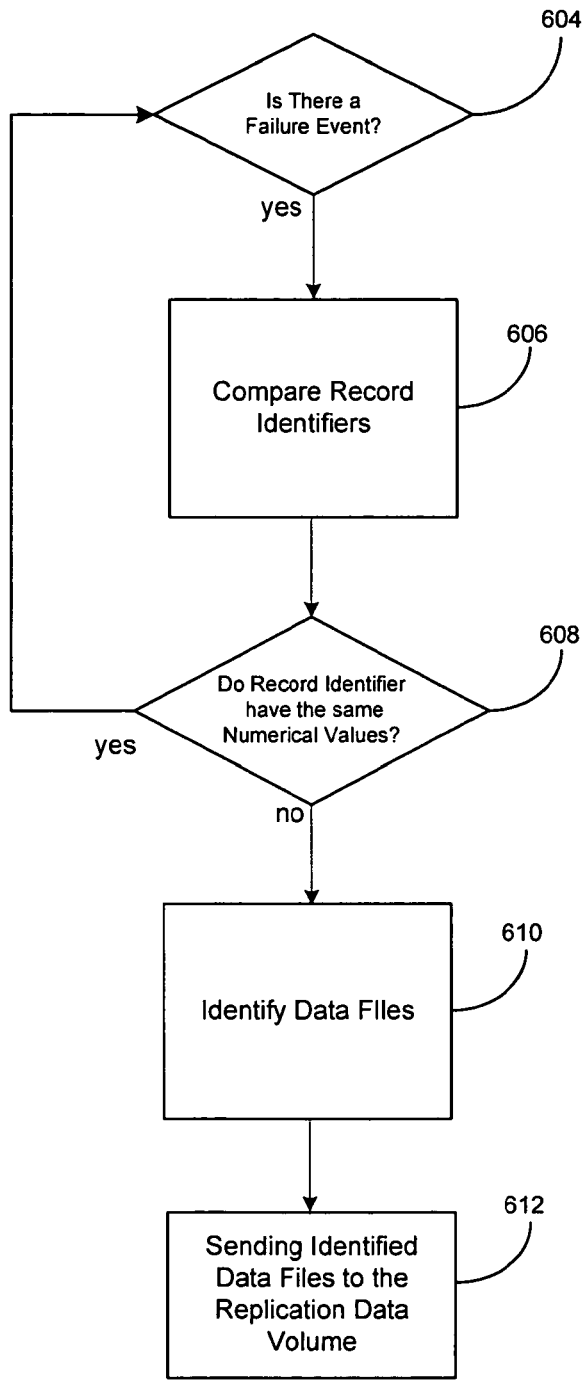
FIG. 6 is a flowchart illustrating some of the steps involved in replication according to an embodiment of the invention.

FIG. 6 is a flowchart 600 illustrating some of the steps involved in a replication resynchronization process in a storage operation system according to an embodiment of the invention. The replication process of FIG. 6 may be described with reference to system architecture 280 illustrated in FIG. 4A to facilitate comprehension. However, it will be understood this merely represents one possible embodiment of the invention and should not be construed to be limited to this exemplary architecture.

At step 604, if a communication failure affecting replication or other event criteria, such as log file corruption, power failure, loss of network, for example, is detected or found and then restored, the most recent record identifier field (e.g., USN number) in the destination log may be accessed and compared with the last record identifier received from the change journal log 241. The replication managers 210, 245 may coordinate and manage the comparison of these record identifier fields, which may include, in one embodiment, comparing identifier values such as USNs used in the MICROSOFT change journal (step 606).

As previously described, write operations or other activities (e.g., file deletions) associated with each file are logged in the change journal records having unique identification numbers (i.e., record identifier) such as a USN number. At step 606, an identification number (e.g., USN number) associated with the last record identifier field stored at the change journal 241 may be compared with an identification number (e.g., USN number) associated with the most recent record identifier stored in the log 260 upon restoration of the communication failure or other event. If it is determined that these identification numbers (e.g., USN numbers) are not the same (step 608), this may indicate that additional file activities (e.g., data write to file operations) may have occurred at the source location (i.e., CLIENT 1), during the failure. These changes may not have been replicated to the second client due to the failure. For example, this may be determined by the last record identifier field's USN number from the change journal 241 at the source having a larger numerical value than the USN number associated with the most recent record identifier field accessed from the log 260. In one embodiment, this may occur as a result of a log filter driver 220 not capturing an event (e.g., a data write operation) or overwriting an event. This may, therefore, lead to a record identifier such as a USN number not being sent to log file 260 associated with the replication data volume of the second client.

Since USN numbers are assigned sequentially, in an embodiment, the numerical comparison between the last record identifier field's USN number stored at the log 260 and the most recent record identifier field's USN number accessed from the change journal 241 may be used to identify any files that may not have been replicated at the replication volume (step 610) of the second client. For example, if the last record identifier field's USN number (i.e., at log 241) is "5" and the most recently sent record identifier field's USN number (i.e., at log 260) is "2," it may be determined that the data objects associated with USN numbers "3, 4, and 5" have not yet be replicated to the second client. Once these data files have been identified (e.g., by data object identifiers such as FRNs in the change journal entries) (step 610), they may be copied from the storage device 235 of the first client and sent over the communication link 275 to the second client (step 612). Thus, the data volumes associated with storage devices 235 and the replication volume may be brought back into sync without the need for resending (or re-copying) all the data files between the two storage devices.

In the exemplary embodiments discussed above, a communication failure may generate an over-flow in the log 225, which in turn may cause a loss of logged entries. As, previously described, these lost entries inhibit the replication process upon restoration of the communication failure. Other failures may also lead to a loss of logged entries in log 225. For example, these failures may include, but are not limited to, corrupted entries in log 225 and/or the inadvertent deletion or loss of entries in log 225.

Figure 7:
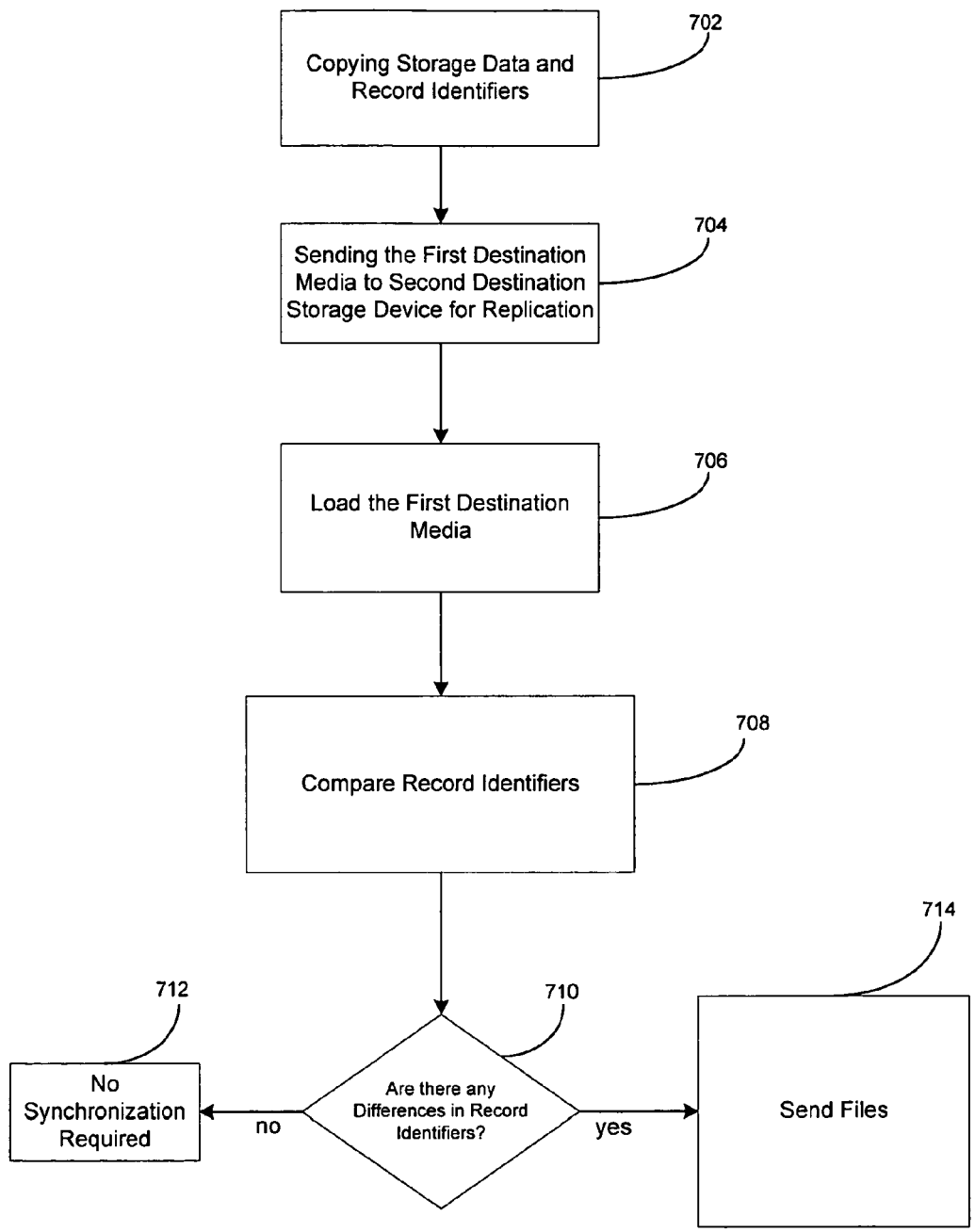
FIG. 7 is a flowchart illustrating some of the steps involved in replication according to another embodiment of the invention.

FIG. 7 is a flowchart 700 illustrating a replication process in a storage operation system according to another embodiment of the invention. The replication process of FIG. 7 may also be described with reference to system architecture 280 illustrated in FIG. 4A to facilitate comprehension. However, it will be understood this merely represents one possible embodiment of the invention and should not be construed to be limited to this exemplary architecture.

The replication process 700 may, in one embodiment, be based on ensuring that electronic data files at a source storage device are synchronized with electronic data files at a destination or target storage device without the need to perform full synchronization operations over the storage operation network.

At step 702, the data files stored on a first storage device 235 and the record identifiers associated with the data records at the first storage device logged in change journal 241 may undergo a data transfer. Examples of certain data transfers include, but are not limited to, a block level copy, storage to a first destination storage medium/media such as magnetic media storage, tape media storage, optical media storage, or any other storage means having sufficient retention and storage capacity.

At step 704, the first destination medium/media, holding data from the first storage device, may be transferred (e.g., by vehicle) to a second destination storage device of the second client in FIG. 4A. At step 706, the data stored on a first destination medium/media may be loaded onto the second destination storage device.

Since copying the data from the first storage device 235 and journal log 241 onto the first destination medium/media and transporting the first destination medium/media to the second destination storage device (e.g., a storage device of the second client, (not shown)), the data files at the first storage device 235 may have undergone changes during this transit period. For example, one or more existing data files may have been modified (e.g., a data write operation), deleted or augmented at the first storage device 235. In order to ensure that an up-to-date replication of the data files is copied to the destination storage device, particularly in light of such changes, a synchronization of data between the data files residing on both the first storage device 235 and the destination storage device may be required.

At step 708, record identifiers such as the USN numbers associated with each data record logged within the change journal 241 are compared with the record identifiers associated with data loaded onto the second destination storage device. This process may be performed, as during the time period between the first storage device 235 data files and the record identifiers being copied to the first destination medium/media and being transferred to the second destination storage device, the data files at the first storage device 235 may have undergone changes (e.g., modify, write, delete etc.). Based on these changes to the data files at the first storage device 235, additional data record entries (e.g., the change journal entries) may have been created in change journal 241.

At step 710, the process determines whether data files at the first storage device 235 have changed compared to their copies stored at the destination storage device. As previously described (step 708), this is achieved by comparing the record identifiers (e.g., USN numbers) associated with each data record logged within the change journal 241 with the record identifiers associated with data loaded onto the second destination storage device. For example, if the USN numbers are the same, at step 712 it may be determined that no synchronization of data is required as the data has not changed. Thus, there is an indication that the data files at the first storage device 235 have not changed since being copied to the second destination storage device. However, for example, if at step 710 it is determined that the USN numbers associated with each data record logged within the change journal 241 are not the same as the USN numbers loaded onto the second destination storage device, the data files associated with the USN numbers that were not loaded onto the second destination storage device may be sent via a communication pathway from the first storage device 235 to the second destination storage device. Thus, the data files associated with the first storage device 235 (source location) are synchronized with the data files at second destination storage device (target location).

Systems and modules described herein may comprise software, firmware, hardware, or any combination(s) of software, firmware, or hardware suitable for the purposes described herein. Software and other modules may reside on servers, workstations, personal computers, computerized tablets, PDAS, and other devices suitable for the purposes described herein. Software and other modules may be accessible via local memory, via a network, via a browser or other application in an ASP context or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A system of synchronizing data between a first and second storage device comprising:
    a first log stored in computer readable memory, the first log captures changes to first data stored on a first storage device, the first log comprising at least a first set of changes to first data stored on at least a first storage device;
    a first replication manager comprising computer hardware that transmits over a network at least a portion of the first set of changes captured in the first log to a second log stored on one or more second storage devices, wherein transmitting the portion of the first set of changes creates a second set of changes in the second log;
    a second replication manager comprising computer hardware that replicates the first set of changes to the first data, by performing the second set of changes in the second log to create second data stored on the one or more second storage devices, wherein the second data is a replication of the first data stored on the first storage device;
    after detection of a network communication error, at least one of the first and second replication managers compare the second set of changes in the second log with the first set of changes to the first data to determine whether there is missing change data in the second set of changes; and
    at least one of the first and second replication managers update the second data on the one or more second storage devices upon detection of the missing change data, wherein the update of the second data comprises copying at least a portion of the first data stored on the first storage device to the one or more second storage devices.

2. The system of claim 1 wherein the record identifiers are associated with change journal entries.

3. The system of claim 1 wherein the record identifiers comprise at least an update sequence number.

4. The system of claim 1 wherein the record identifiers comprise at least a file reference number.

5. A method of replicating data comprising:
    storing in a first log, changes to first data stored on one or more first storage devices, the first log further comprises record identifiers that are associated with the changes to the data files;
    copying at least a portion of a first set of changes and a first set of record identifiers in the first log to a second log stored on one or more second storage devices to create a second set of changes and a second set of record identifiers in the second log;
    replicating with computer hardware, the portion of the first set of changes to the first data, by performing the second set of changes in the second log to create second data stored on the one or more second storage devices, wherein the second data is a replication of the first data stored on the one or more first storage devices;
    comparing with computer hardware, the second set of record identifiers in the second log with the first set of record identifiers in the first log to determine whether there is missing change data in the second set of changes; and
    updating with computer hardware, the second data on the one or more second storage devices upon detection of the missing change data, wherein updating the second data comprises copying at least a portion of the first data stored on the one or more first storage devices to the one or more second storage devices.

6. The method of claim 5 wherein copying the portion of the first set of changes and the first set of record identifiers in the first log to the second log the transmitting occurs upon reaching a threshold capacity of the first log.

7. The method of claim 5 further comprising associating the record identifiers with change journal entries.

8. The method of claim 7 further comprising comparing at least one of the record identifiers associated with the change journal entries to a record identifier of a previously stored change journal entry on the second storage device, wherein non-identical identifiers signify non-synchronized data.

9. The method of claim 5 wherein the record identifiers comprise at least an update sequence number.

10. The method of claim 5 wherein the record identifiers comprise at least a file reference number.

11. The method of claim 5 wherein the record identifiers comprise at least one of (i) a time stamp, and (ii) information about a type of change.

12. The method of claim 5 further comprising resynchronizing the replication based on missing record identifiers.

13. A data replication system comprising:
- a first log stored in computer accessible memory, the first log records changes to first data stored on one or more first storage devices, the first log further comprising record identifiers that are associated with the changes to the data files;
- a first replication manager comprising computer hardware that copies at least a portion of a first set of changes and a first set of record identifiers in the first log to a second log stored on one or more second storage devices to create a second set of changes a second set of record identifiers in the second change log;
- a second replication manager comprising computer hardware that replicates at least a portion of the first set of changes to the first data, by performing the second set of changes in the second log to create second data stored on the one or more second storage devices, wherein the second data is a replication of the first data stored on the one or more first storage devices;
- at least one of the first and second replication managers compares the second set of record identifiers in the second log with the first set of record identifiers in the first log to determine whether there is missing change data in the second set of changes; and
- at least one of the first and second replication managers updates the second data on the one or more second storage devices upon detection of the missing change data, wherein updating the second data comprises copying at least a portion of the first data stored on the one or more first storage devices to the one or more second storage devices.

14. The data replication system of claim 13 wherein the computer hardware copies the portion of the first set of changes and the first set of record identifiers in the first log to the second log upon reaching a threshold capacity of the first log.

15. The data replication system of claim 13 wherein the record identifiers are associated with change journal entries.

16. The data replication system of claim 15 further comprising comparing at least one of the record identifiers associated with the change journal entries to a record identifier of a previously stored change journal entry on the second storage device, wherein non-identical identifiers signify non-synchronized data.

17. The data replication system of claim 13 wherein the record identifiers comprise at least an update sequence number.

18. The data replication system of claim 13 wherein the record identifiers comprise at least a file reference number.

19. The data replication system of claim 13 wherein the record identifiers comprise at least a file reference number.

20. The data replication system of claim 13 wherein the record identifiers comprise at least one of (i) a time stamp, and (ii) information about a type of change.

* * * * *